US012113873B2

(12) United States Patent
Matejka et al.

(10) Patent No.: US 12,113,873 B2
(45) Date of Patent: Oct. 8, 2024

(54) TECHNIQUES FOR ANALYZING THE PROFICIENCY OF USERS OF SOFTWARE APPLICATIONS IN REAL-TIME

(71) Applicant: AUTODESK, INC., San Rafael, CA (US)

(72) Inventors: Justin Frank Matejka, Newmarket (CA); Fraser Anderson, Camrose (CA); George Fitzmaurice, Toronto (CA); Tovi Grossman, Toronto (CA); Warren Karl Schrey, Toronto (CA); Christian Smitherman, Toronto (CA)

(73) Assignee: AUTODESK, INC., San Francisco, CA (US)

( * ) Notice: Subject to any disclaimer, the term of this patent is extended or adjusted under 35 U.S.C. 154(b) by 0 days.

(21) Appl. No.: 17/069,334

(22) Filed: Oct. 13, 2020

(65) Prior Publication Data
US 2021/0152648 A1    May 20, 2021

Related U.S. Application Data

(60) Provisional application No. 62/936,363, filed on Nov. 15, 2019.

(51) Int. Cl.
*H04L 67/50* (2022.01)
*G06F 3/14* (2006.01)
(Continued)

(52) U.S. Cl.
CPC .............. *H04L 67/535* (2022.05); *G06F 3/14* (2013.01); *G06F 9/451* (2018.02); *G06F 11/3438* (2013.01); *H04L 67/01* (2022.05)

(58) Field of Classification Search
CPC ........... G06F 16/9535; G06F 16/24575; G06F 16/951; G06F 40/30; G06F 11/3438;
(Continued)

(56) References Cited

U.S. PATENT DOCUMENTS 6,343,508 B1    2/2002 Feller
7,519,539 B1    4/2009 Fliess et al.
(Continued)

FOREIGN PATENT DOCUMENTS

WO    98/05018 A1    2/1998

OTHER PUBLICATIONS

Non Final Office Action received for U.S. Appl. No. 16/364,010 dated Jul. 8, 2021, 46 pages.
(Continued)

*Primary Examiner* — Ninos Donabed
(74) *Attorney, Agent, or Firm* — Artegis Law Group, LLP

(57) ABSTRACT

A command map GUI that illustrates command usage patterns of one or more entities. A server receives and stores command usage data from a plurality of users/clients, each user/client executing a software application having a set of commands. A current user/client displays, via a GUI, graphical representations of the command usage data received from the server. The server receives new command usage data from a user/client included in the one or more entities. In response, the server automatically updates command usage data for the one or more entities, pushes the updated command usage data to the current user/client, and causes the GUI to display graphical representations of the updated command usage data. Thus, the command usage data of the one or more entities is automatically updated and displayed in the GUI in real-time or near real-time as new commands are continually invoked by users in the one or more entities.

18 Claims, 18 Drawing Sheets

(51) Int. Cl.
*G06F 9/451* (2018.01)
*G06F 11/34* (2006.01)
*H04L 67/01* (2022.01)

(58) Field of Classification Search
CPC ............ G06F 40/56; G06F 9/451; G06F 3/14; H04L 67/22; H04L 51/04; H04L 67/42; G06N 5/048; G06N 20/00; G06N 7/005; G06Q 50/01; G06Q 10/10; G06Q 30/0269
See application file for complete search history.

(56) References Cited

U.S. PATENT DOCUMENTS

| | | | |
|---|---|---|---|
| 7,692,653 B1 | 4/2010 | Petro et al. | |
| 8,350,856 B1 | 1/2013 | Nazir et al. | |
| 8,610,718 B2 | 12/2013 | Suntinger et al. | |
| 8,965,874 B1* | 2/2015 | Vassilakis | G06F 16/9535 |
| | | | 707/706 |
| 9,424,670 B1 | 8/2016 | Jin et al. | |
| 10,475,219 B1 | 11/2019 | Antihi et al. | |
| 2005/0093866 A1 | 5/2005 | Ebert | |
| 2005/0096866 A1 | 5/2005 | Ebert | |
| 2005/0246184 A1 | 11/2005 | Abbadessa et al. | |
| 2008/0208027 A1 | 8/2008 | Heaton | |
| 2008/0262887 A1 | 10/2008 | Guthrie | |
| 2008/0270203 A1 | 10/2008 | Holmes | |
| 2009/0049389 A1 | 2/2009 | Kuzmanovic | |
| 2010/0131896 A1* | 5/2010 | Fitzmaurice | G06T 11/60 |
| | | | 715/811 |
| 2011/0115814 A1 | 5/2011 | Heimendinger et al. | |
| 2011/0154216 A1 | 6/2011 | Aritsuka et al. | |
| 2012/0117476 A1 | 5/2012 | Siegrist | |
| 2012/0253891 A1 | 10/2012 | Hayes | |
| 2013/0076756 A1 | 3/2013 | Pritting | |
| 2013/0328745 A1* | 12/2013 | Koltuk | G06F 3/1446 |
| | | | 345/1.3 |
| 2014/0025441 A1 | 1/2014 | Eberlein et al. | |
| 2014/0379694 A1* | 12/2014 | Denise | G06F 16/951 |
| | | | 707/722 |
| 2015/0032873 A1* | 1/2015 | Chen | H04L 67/306 |
| | | | 709/224 |
| 2015/0040052 A1 | 2/2015 | Noel et al. | |
| 2015/0089424 A1 | 3/2015 | Duffield et al. | |
| 2015/0100897 A1* | 4/2015 | Sun | G06Q 10/10 |
| | | | 715/753 |
| 2015/0229532 A1 | 8/2015 | Somaiya | |
| 2015/0235155 A1 | 8/2015 | McGuffin | |
| 2015/0301997 A1* | 10/2015 | Otaki | G06F 40/186 |
| | | | 715/271 |
| 2015/0302535 A1 | 10/2015 | Dodd | |
| 2015/0324106 A1 | 11/2015 | Lewis et al. | |
| 2015/0331921 A1 | 11/2015 | Kudo et al. | |
| 2016/0019400 A1* | 1/2016 | Li | H04L 63/0407 |
| | | | 726/28 |
| 2016/0098177 A1 | 4/2016 | Kraut | |
| 2016/0132203 A1* | 5/2016 | Seto | G06F 3/0482 |
| | | | 715/830 |
| 2016/0260346 A1 | 9/2016 | Afrinere et al. | |
| 2016/0275436 A1 | 9/2016 | Kurjanowicz et al. | |
| 2016/0343100 A1 | 11/2016 | Davenport et al. | |
| 2017/0154307 A1* | 6/2017 | Maurya | H04L 67/306 |
| 2017/0185253 A1 | 6/2017 | Vaglio | |
| 2017/0351686 A1 | 12/2017 | Fackler et al. | |
| 2018/0004851 A1 | 1/2018 | Zarins et al. | |
| 2018/0011876 A1* | 1/2018 | Li | G06F 16/9535 |
| 2018/0012391 A1 | 1/2018 | Han et al. | |
| 2018/0239496 A1 | 8/2018 | Zhang et al. | |
| 2018/0301047 A1 | 10/2018 | Mayoraz | |
| 2018/0341394 A1 | 11/2018 | Sangli | |
| 2018/0357922 A1 | 12/2018 | Dutta et al. | |
| 2019/0122161 A1 | 4/2019 | Cicio, Jr. | |
| 2019/0244113 A1 | 8/2019 | Ramos et al. | |
| 2020/0050431 A1 | 2/2020 | Zilouchian Moghaddam et al. | |
| 2020/0133819 A1* | 4/2020 | Grossman | G06F 3/0481 |
| 2020/0159862 A1 | 5/2020 | Kleiner et al. | |
| 2020/0177593 A1* | 6/2020 | Bender | H04L 63/101 |
| 2021/0294519 A1* | 9/2021 | Radhapuram | G06F 3/0655 |

OTHER PUBLICATIONS

Non Final Office Action received for U.S. Appl. No. 16/363,997 dated Jan. 6, 2021, 36 pages.
Final Office Action received for U.S. Appl. No. 16/363,997 dated Jul. 28, 2021, 32 pages.
Non Final Office Action received for U.S. Appl. No. 16/363,997 dated Mar. 26, 2020, 39 pages.
Final Office Action received for U.S. Appl. No. 16/363,997, dated Jul. 28, 2020, 47 pages.
Final Office Action received for U.S. Appl. No. 16/364,010 dated Nov. 4, 2021, 27 pages.
Non Final Office Action received for U.S. Appl. No. 16/364,010 dated Mar. 29, 2022, 19 pages.
Non Final Office Action received for U.S. Appl. No. 16/363,997, dated Apr. 28, 2022, 53 pages.
International Search Report for application No. PCT/US2019/057457 dated May 4, 2020.
Final Office Action received for U.S. Appl. No. 16/363,997 dated Nov. 17, 2022, 47 pages.
Final Office Action received for U.S. Appl. No. 16/364,010 dated Oct. 17, 2022, 30 pages.
Advisory Action received for U.S. Appl. No. 16/363,997, dated Feb. 8, 2023, 8 pages.
Non Final Office Action received for U.S. Appl. No. 16/363,997, dated Apr. 27, 2023, 46 pages.
Non Final Office Action received for U.S. Appl. No. 16/364,010, dated Jun. 27, 2023, 24 pages.
Final Office Action received for U.S. Appl. No. 16/364,010, dated Nov. 15, 2023, 32 pages.
Final Office Action received for U.S. Appl. No. 16/363,997, dated Nov. 7, 2023, 62 pages.
Notice of Allowance received for U.S. Appl. No. 16/363,997, dated Feb. 5, 2024, 20 pages.
Notice of Allowance received for U.S. Appl. No. 16/364,010, dated Feb. 6, 2024, 14 pages.

* cited by examiner

|  | 205 | 210 | 215 | 220 |
|---|---|---|---|---|
| 201a | Category1 | 0-45 | Command1a<br>Command1b<br>Command1c<br>⋮ | 1<br>2<br>3<br>⋮ |
| 201b | Category2 | 45-90 | Command2a<br>Command2b<br>Command2c<br>⋮ | 45<br>46<br>47<br>⋮ |
| 201c | Category3 | 90-135 | Command3a<br>Command3b<br>Command3c<br>⋮ | 91<br>92<br>93<br>⋮ |

Figure 2

|  | 255 | 260 | 265 | 270 |
|---|---|---|---|---|
| 251a | Level1 | 0-w1 | 0-9 | r1 |
| 251b | Level2 | w2-w3 | 10-149 | r2 |
| 251c | Level3 | w4-w5 | 150-299 | r3 |

Figure 3

TECHNIQUES FOR ANALYZING THE PROFICIENCY OF USERS OF SOFTWARE APPLICATIONS IN REAL-TIME

CROSS-REFERENCE TO RELATED APPLICATIONS

This application claims the benefit of the United States provisional patent application titled, "TECHNIQUES FOR ANALYZING THE PROFICIENCY OF USERS OF SOFTWARE APPLICATIONS," filed on Nov. 15, 2019 and having Ser. No. 62/936,363. The subject matter of this related application is hereby incorporated herein by reference.

BACKGROUND

Field of the Various Embodiments

The various embodiments relate generally to computer science and, more specifically, to techniques for analyzing the proficiency of users of software applications in real-time.

DESCRIPTION OF THE RELATED ART

Software applications, such as computer-aided design (CAD) applications, are commonly used by architects, engineers, and other design professionals to aid in the creation, modification, analysis, and/or optimization of a design. Among other things, using software applications can substantially increase the productivity of the designer and/or improve the overall quality of a design. For example, a CAD application can be used to construct computer models representing real-world constructs, such as office buildings, airplanes, electronic appliances, and the like. The output of a software application also can include electronic files comprising a three-dimensional (3D) printable design that can be exported to a 3D fabrication device that fabricates a physical product.

Advances in software applications, as well as other types of software applications, have significantly increased the number and complexity of commands that can be invoked by users. However, a typical user may only understand and invoke only a small portion of the available commands in a modern design or other software application. The proficiency of a user in a particular software application can be measured by the user's pattern of command usage, including an amount of command usage (number of command invocations) for particular commands as well as the breadth of command usage (the range of invoked commands) across all available commands of the particular software application. Knowledge of the command usage patterns of the user as well comparisons to command usage patterns of other users and groups can be helpful for the user to understand his/her proficiency in using the software application.

Currently, a technical problem exists with respect to enabling a user to evaluate his/her command usage patterns for a particular software application in real-time. Conventionally, for a user to evaluate his/her command usage patterns for a software application dynamically, the user would have to request/retrieve command usage data from a program that logs command usage data for various users of the software application. The command usage data would have to be converted into a form that allows the user to evaluate and comprehend his/her command usage patterns. Further, as the user invokes new commands when using the software application, the user would have to continually request the command usage data from the program, and the command usage data would have to be converted every time into a useful form for the user. Notably, however, solutions that enable command usage data to be automatically collected, processed, and presented to users in a useful form in real-time as those users continually invoke new commands when using a software application have not yet been developed.

As the foregoing illustrates, what is needed in the art are more effective techniques for analyzing the proficiency of a user of a software application in real-time.

SUMMARY

Various embodiments include a computer-implemented method for displaying a command map graphical user interface (GUI). The computer-implemented method includes receiving, at a client device, initial command usage data for a first user entity indicating how much the first user entity has used a set of commands of a software application. The computer-implemented method also includes displaying one or more graphical representations of the initial command usage data via a command map graphical user interface (GUI). The computer-implemented further includes receiving, at the client device, updated command usage data for the first user entity that has been pushed to the client device and has been generated based on new command usage data not included in the initial command usage data. The computer-implemented further includes, in response to receiving the updated command usage data, automatically displaying one or more graphical representations of the updated command usage data via the command map GUI.

At least one technical advantage of the disclosed techniques relative to the prior art is that updated command usage data is automatically pushed to a computer device in real-time or near real-time to enable the computer device to dynamically generate and display graphical representations of the updated command usage data via a command map graphical user interface (GUI). The graphical representations of the updated command usage data also are displayed in real-time or near real-time to visually indicate how much a particular entity (user or group of users) uses the different commands of a software application. Another technical advantage is that the disclosed techniques allow a user to more immediately evaluate his/her command usage patterns, as well as compare his/her command usage patterns to other entities, in real-time or near real-time as the user and/or other entities repeatedly/continually invoke the commands of a software application. In that regard, because command usage data is updated and displayed via the command map GUI in real-time or near real-time, the user is more engaged and more conscious of his/her command usage patterns. Further, because the command map GUI enables the interactions of a user or group of users with a computer device through command usage patterns to be efficiently and effectively visualized and displayed, the disclosed techniques in real-time can improve the overall functioning and operations of the computer device relative to the prior art. These technical advantages represent one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, can be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 2 is a conceptual diagram of a first section of a command map table, according to various embodiments;

FIG. 3 is a conceptual diagram of a second section of a command map table, according to various embodiments;

DETAILED DESCRIPTION

Figure 1:
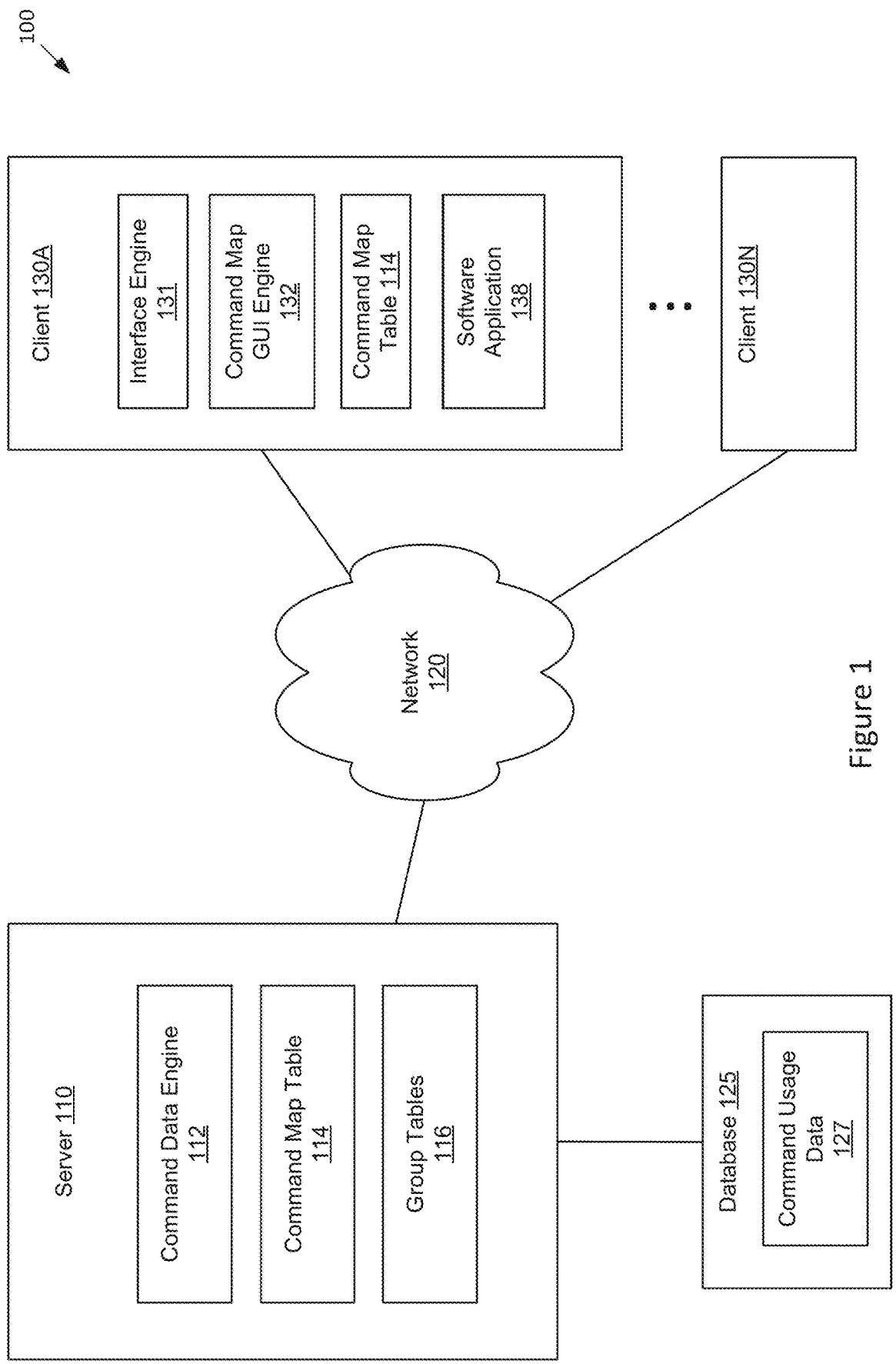
FIG. 1 illustrates a command map system configured to implement one or more aspects of the various embodiments.

In the following description, numerous specific details are set forth to provide a more thorough understanding of the various embodiments. However, it will be apparent to one of skilled in the art that the inventive concepts can be practiced without one or more of these specific details.

As used herein, an "entity" can comprise an individual user or a group of two or more users.

As used herein, a "command" of a software application can comprise a specific command that is provided and enabled by the software application. A user of the software application can use/perform the command by invoking/executing the command. Each performance of the command by the user can count as a single invocation/execution of the command by the user.

As used herein, a "command category" of a software application can comprise a grouping of two or more related commands of the software application. The grouping of two or more commands can be determined based on any logical relationship between the two or more commands, for example, as determined by a server administrator. Examples of command categories include model, render, drawing, sketch, animation, mesh, surface, simulation, and the like. In other embodiments, the command categories of a software application include other types of command categories.

As used herein, an "invocation value" can indicate various values depending on the context used. In general, an invocation value of a command or command category indicates the amount of usage of the command or command category. For a user, the invocation value of a command can indicate the total number of times/instances the command has been invoked/executed by the user. For a user, the invocation value of a command category can indicate the average number of times the commands of the command category have been invoked by the user (e.g., the total number of times all commands of the command category have been invoked divided by the total number of commands in the command category). For a group of two or more users, the invocation value of a command can indicate the average number of times the command is invoked by the users in the group (e.g., the total number of times the command is invoked by all users in the group divided by the total number of users in the group). For a group of two or more users, the invocation value of a command category can indicate the average number of times the commands of the command category are invoked by the users of the group (e.g., as calculated by determining the average number of invocations for commands in the command category for each user, summing the average numbers for all users in the group, and dividing the summed total by the total number of users in the group).

As used herein, a "distance" or "width" can be measured in predetermined units. For example, a "distance" or "width" can be measured in a number of pixels.

As used herein, a "distance from center" for a given point in a circle chart can refer to a distance from the given point to a perimeter of a center inner circle of the circle chart, as measured by a line connecting the given point to a center point of the circle chart.

As used herein, a "table" can comprise any type of data container, such as a data file, document, or the like.

As used herein, an "command usage data" can indicate different types of information regarding usage of commands and command categories by an entity depending on the context used. For example, command usage data can include command event data that describe particular instances of invoked commands by various users. As another example, command usage data can indicate compiled information regarding the command usage and/or command category usage of a particular group, as stored to a group table. In general, the command usage data for an entity indicates how much the entity has used a set of commands of a software application.

As used herein, a "different appearance" between a first element and a second element indicates that the displayed appearance of the first element is different than the displayed appearance of the second element in at least one display characteristic, such as color, color intensity, brightness, texture, shading, pattern, line form, and the like.

As used herein, a "current user/client" is a user/client that has requested/subscribed to view command usage data for a software application for one or more entities. As used herein, an "invoking user/client" is a user/client included in the one or more entities that has invoked a new instance of a command of the software application. The current user/client can be the same or different from the invoking user/client.

As disclosed in the embodiments herein, a command map GUI system generates and displays a command map GUI that displays one or more graphical representations of command usage data for a first entity (a user or group) in real-time or near real-time, the command usage data indicating how much the first entity has used a set of commands of a software application. As used herein, after an entity invokes a command, the command map GUI displays one or more graphical representations of the invoked command in "real-time" by displaying the one or more graphical representations immediately after the command is invoked, with little discernible delay (e.g., up to two seconds) after the command is invoked. In other embodiments, after an entity invokes a command, the command map GUI displays one or more graphical representations of the invoked command in "near real-time" by displaying the one or more graphical representations shortly after the command is invoked, with some user-discernible delay (e.g., two or more seconds) after the command is invoked. In this manner, the command map GUI visually illustrates command usage patterns of the first entity for the software application in real-time or near real-time. The command map GUI can also visually illustrate a comparison between the command usage patterns between a plurality of entities in real-time or near real-time, such as comparison between the command usage patterns of a first entity and the command usage patterns of a second entity for the software application. The software application can comprise any type of computer-based software application or suite, such as a design application or any other type of software application. The GUI system can operate in two phases: a data collection phase and a runtime phase.

During a data collection phase, the command map GUI system collects, at a server, command usage data for a plurality of users/clients connected to the server. Each client can execute a software application while a user invokes/executes different instances of various commands of the software application. In general, the software application can provide and enable a plurality of command categories, each command category comprising a plurality of related commands. Each client can capture command usage data (command event data) for each instance of an invoked/executed command by the user (each invocation of a command), and transmit the command usage data to the server. The server receives command usage data from the various users/clients and stores the received command usage data to a database. The command usage data regarding each invoked command can include a unique identifier for the user (user ID), a unique identifier for the invoked command (command ID), and a timestamp. Each client also stores a command map GUI engine and a command map table comprising a plurality of parameters for generating a command map GUI.

During the runtime phase, a current user/client executes an initiation process for initiating the command map GUI. In the initiation process, the current user/client executes the command map GUI engine, which generates and displays the command map GUI based on the command map table. Via the command map GUI, the current user/client then selects one or more data filtering parameters (such as one or more entities and a time period) for filtering the command usage data stored on the server. For example, the current user/client can select to view the command usage data for a first entity (a user or a group of users) for a particular time period, which causes the current user/client to query the server for initial command usage data for the first entity during the particular time period. In response, the server retrieves the command usage data for the first entity during the particular time period and transmits the initial command usage data in a response to the current user/client. The current user/client then generates and displays the command map GUI based on the initial command usage data and the command map table. The command usage data implemented during the initiation phase is referred to herein as the initial command usage data.

In some embodiments, after the initiation process of the runtime phase is performed, the command map GUI system enters a dynamic runtime mode whereby one or more users of a selected first entity repeatedly/continually invoke new commands of the software application and new command usage data for the new commands is repeatedly/continually generated and displayed to the command map GUI in real-time or near real-time. A user included in the first entity that invokes/executes a new command is referred to as the invoking user. In these embodiments, a "new command" comprises a new invocation (new instance) of a particular command of the software application that has not been previously recorded by the server (i.e., the new command usage data generated for the new command has not been previously received and stored to the server). When a new command for the software application is executed by an invoking user/client included in the first entity, the invoking user/client generates and transmits new command usage data for the new command to the server. The new command usage data is not previously included in the initial command usage data.

In response to receiving the new command usage data, the server automatically updates the command usage data for the first entity based on the new command usage data, and automatically pushes/transmits the updated command usage data for the first entity to the current user/client in real-time or near real-time. The updated command usage data represents and/or includes the new command usage data, which was not previously included in the initial command usage data. The new command usage data indicates how much the first entity has used the set of commands of the software application after the initial command usage data is received by the current user/client. Note that the invoking user/client comprises a user within the selected first entity and the current user/client comprises a subscribing user/client that has requested/subscribed to view command usage data for the first entity. The current user/client can be the same or different from the invoking user/client.

In these embodiments, the server automatically pushes updated command usage data to the current user/client in response to receiving any new command usage data from any user within the first entity. As such, the server generates and transmits the updated command usage data without having to receive any request/query from the current user/client to send the updated command usage data to the current user/client. Therefore, "pulling" (requesting) of the updated command usage data from the server is not required by the current user/client. Receiving the pushed updated command usage data causes the current user/client to automatically generate and display one or more graphical representations of the updated command usage data via the command map GUI in real-time, which visually indicate updated command usage patterns of the first entity.

In this manner, the GUI system can automatically and dynamically illustrate the command usage patterns of a user entity in real-time or near real-time in the command map GUI as the user entity continues to invoke new commands of the software application. In particular, the command map GUI automatically receives updated command usage data in response to each new command invoked by any user included in the user entity (without requesting the updated command usage data), and automatically generates and displays graphical representations of the updated command usage data that visually indicate the updated command usage patterns of the user entity (without the current user requesting the displaying of the updated graphical representations).

In some embodiments, the command map GUI displays a circle chart comprising a plurality of segments, each segment corresponding to and representing a particular command category of the software application. The command map GUI can also display a wedge inside each segment for representing the usage by the first entity of the command category corresponding to the segment. In particular, the size of each wedge graphically/visually illustrates the amount of usage of the corresponding command category by the first entity. For a first entity comprising a user, the wedge can visually illustrate the average number of invocations for the commands in the command category that have been performed by the user. For a first entity comprising a group of users, the wedge can represent the average number of invocations for the commands in the command category that have been performed by the users in the group.

The command map GUI can automatically and dynamically update the size/area of each wedge based on updated command usage data received for the first entity in real-time or near real-time. In operation, the command map GUI automatically updates the size/area of a wedge on the circle chart from a first size/area of the wedge prior to the updated command usage data being received to a second size/area of the wedge after the updated command usage data is received. In these embodiments, the command map GUI automatically and dynamically updates the size/area of each wedge to illustrate the most current amount of usage of the corresponding command category based on the real-time (most current) command usage data for the first entity.

In some embodiments, within the circle chart, the command map GUI displays a plurality of data points (e.g., small dots). Each data point corresponds to and represents a particular command of a particular command category. A data point that represents a command can be displayed within the segment that represents the command category that includes the command. In some embodiments, the distance of a particular data point from the center of the circle chart graphically/visually illustrates the amount of usage of the corresponding command by the first entity. For a first entity comprising a user, a data point can represent the total number of invocations for the corresponding command by the user. For a first entity comprising a group of users, the data point can represent the average number of invocations for the corresponding command by the users of the group.

The command map GUI can automatically and dynamically update the distance/position of a data point from the center of the circle chart based on updated command usage data received for the first entity in real-time. In operation, the command map GUI automatically updates the distance/position of a data point on the circle chart from a first distance/position of the data point prior to the updated command usage data being received to a second distance/position of the data point after the updated command usage data is received. In these embodiments, the command map GUI automatically and dynamically updates the distance/position of a data point from the center of the circle chart based on the real-time (most current) command usage data for the first entity.

During an initiation process of the command map GUI, the current user/client can also select to view the command usage data of the first entity in comparison to a second entity (a user or group) for a particular time period. In response, the current user/client queries and receives from the server the command usage data for the first entity and the second entity for the particular time period. The current user/client then generates and displays the command map GUI based on the received command usage data and the command map table. The command usage data during the initiation phase is referred to herein as the initial command usage data. In some embodiments, the command map GUI displays a first wedge inside each segment for visually illustrating the usage of the corresponding command category by the first entity and a second wedge inside each segment for visually illustrating the usage of the corresponding command category by the second entity. The second wedge can be displayed with a different appearance than the first wedge to allow the user to easily distinguish between the first wedge and the second wedge. In these embodiments, the first and second wedges can be displayed in a segment simultaneously to allow easy visual comparison of the command category usage between the first and second entities.

The command map GUI can automatically and dynamically update the size/area of each wedge to illustrate the most current amount of usage of the corresponding command category by the first entity and the second entity based on the updated command usage data received for the first entity or the second entity in real-time or near real-time. In operation, the command map GUI automatically updates the size/area of a wedge on the circle chart from a first size/area of the wedge prior to the updated command usage data being received to a second size/area of the wedge after the updated command usage data is received. In these embodiments, the command map GUI can automatically and dynamically update the size/area of each wedge based on the real-time (most current) command usage data for the first entity and the second entity.

The command map GUI can also display a plurality of data points within the circle chart, each data point visually representing the amount of usage of a corresponding command for the second entity. In some embodiments, the data points are not displayed for the first entity to avoid visual clutter in the circle chart. Rather, in these embodiments, a data point for the second entity is displayed with a particular visual appearance to indicate whether the first entity has used the corresponding command more than or less than the second entity. A data point representing a command can be displayed with a first appearance (e.g., colored blue) to indicate that the first entity has invoked the command a greater number of times than the second entity. The data point can be displayed with a second appearance (e.g., colored red) to indicate that the first entity has invoked the command a fewer number of times than the second entity, wherein the second appearance has a different appearance than the first appearance. In these embodiments, the data points can be displayed with the different appearances to allow easy visual comparison of the command usage between the first and second entities. The command map GUI can automatically and dynamically update the visual appearance of each data point for the second entity based on updated command usage data received for the first entity or the second entity in real-time or near real-time.

In this manner, the disclosed techniques enable the GUI system to generate and display a command map GUI that visually illustrates an amount of usage for commands and command categories by a first entity in real-time or near real-time. The disclosed techniques further enable the GUI system to generate and display a command map GUI that visually illustrates a comparison between an amount of usage for commands and command categories between a first entity and a second entity in real-time or near real-time. Thus, the disclosed technique provides a technological improvement and technological advancement over prior approaches as the disclosed technique generates and displays the command map GUI for allowing a user to immediately evaluate and comprehend his/her command usage patterns and/or compare his/her command usage patterns to other users or groups in real-time or near real-time.

Command Map System

FIG. 1 illustrates a command map system 100 configured to implement one or more aspects of the various embodiments. As shown, the command map system 100 includes a server 110 and a plurality of clients 130 (e.g., 130A-130N) coupled via a network 120. Each client/client 130 is associated with and corresponds to a particular user who operates the client 130. The network 120 can comprise any technically feasible communications or information network, wired or wireless, that allows data exchange, such as a wireless (Wi-Fi) network, personal area network (such as Bluetooth, Wireless USB, IrDA, etc.), wide area network (WAN), a local area network (LAN), and/or the Internet, among others.

The server 110 can comprise a computing device or machine, such as a server system, desktop computer, laptop computer, or any other type of computing device suitable for practicing various embodiments. The client 130 can comprise a computing device or machine, such as a desktop computer, laptop computer, mobile device, or any other type of computing device suitable for practicing various embodiments. The server 110 and client 130 comprise computer hardware components such as memory for storing software application(s) and data and processors that execute the software application(s) to provide processing engines that enable the operations and functions described herein. The computer hardware components of the server 110 and client 130 are discussed below in relation to FIGS. 16-17. In this regard, the server 110 hosts and executes a command data engine 112 and each client 130A-130N hosts and executes a command map GUI engine 132.

The server 110 executes a command data engine 112 and can store a command map table 114, and at least one group table 116 for performing embodiments herein. The server 110 can be connected to a database 125 that stores command usage data 127 received from the clients 130. The command data engine 112 can interact with the clients 130 for receiving and storing command usage data 127 to the database 125. The command data engine 112 can respond to client queries for initial command usage data 127, the command map table 114, and the one or more group tables 116. The command data engine 112 can also receive new command usage data describing a new command, and in response, automatically update the command usage data 127 and one or more group tables 116 based on the new command usage data, and push/send updated command usage data to one or more clients 130.

Each client 130 executes an interface engine 131, a command map GUI engine 132, and a software application 138 and stores the command map table 114. The software application 138 can comprise any type of computer-based software application or suite. For example, the software application 138 can comprise a design application, such as a computer-aided design (CAD) application, computer-aided engineering (CAE) application, simulator application, modeler application, geometry generator application, a software engineering suite, or the like. In other embodiments, the software application 138 can comprise any other type of software application, other than design and/or engineering-based applications.

The interface engine 131 acts as an interface between the command data engine 112 executing on the server 110 and the various engines executing on the client 130 (such as the command map GUI engine 132 and/or the software application 138). In this regard, the interface engine 131 generates command usage data describing commands being executed/invoked on the software application 138 and transmits the command usage data to the command data engine 112 via the network 120. The interface engine 131 can also enable the command map GUI engine 132 to interact with the command data engine 112 via the network 120 for sending queries for particular information and then receiving responses containing the requested information from the command data engine 112 during an initiation process. The requested information can include particular initial command usage data 127, the command map table 114, and one or more group tables 116. The client 130 can further execute the command map GUI engine 132 to generate and display the command map GUI based on the command map table 114 and the requested information received from the server 110, as described in the embodiments herein.

In some embodiments, the interface engine 131 generates new command usage data describing a new command that is executed/invoked on the software application 138, and transmits the new command usage data to the command data engine 112 via the network 120. The new command usage data is not previously included in the initial command usage data, and indicates how much the first entity has used the set of commands of the software application after the initial command usage data is received by the current user/client. In response to receiving the new command usage data, the command data engine 112 automatically updates the command usage data 127 and one or more group tables 116 based on the new command usage data, and pushes the updated command usage data to one or more subscribing clients 130. The updated command usage data represents and/or includes the new command usage data. In response to receiving updated command usage data, the interface engine 131 automatically initiates the command map GUI engine 132 to generate and display the command map GUI based on the updated command usage data, as described in the embodiments herein.

FIG. 2 is a conceptual diagram of a first section of a command map table, according to various embodiments. Each command map table 114 can store various parameters for generating the command map GUI. The command map table 114 can be stored to the server 110 and/or each client device 130 connected to the server 110. The command map table 114 comprises a first section 200 (shown in FIG. 2) and a second section 250 (shown in FIG. 3). The first section 200 can include parameters related to commands and command categories of the software application. The first section 200 can include a plurality of entries 201 (such as 201a, 201b, 201c, etc.), each entry 201 representing a command category of the software application. Each entry 201 for a command category can include different data fields for a name 205, a degree range 210, a set of commands 215, and a set of command degrees 220.

The name 205 can comprise the name or unique identifier of the command category (such as model, render, drawing, sketch, animation, etc.). The degree range 210 specifies a predetermined range of degrees that a segment representing the command category is displayed within the circle chart of the command map GUI. Thus, the degree range 210 also specifies the range of degrees that the wedge representing the amount of usage of the command category is displayed within the circle chart of the command map GUI. The degree range 210 specifies the position or orientation of the corresponding segment and wedge within the circle chart. For example, the degree range 210 for the model command category can specify a range of 0-45 degrees, whereby the segment and wedge representing the model command category is displayed at the position or orientation of 0-45 degrees within the circle chart. For example, the degree range 210 for the render command category can specify a range of 45-90 degrees, whereby the segment and wedge representing the render command category is then displayed at the position or orientation of 45-90 degrees within the circle chart.

The set of commands 215 for a command category can specify two or more identifiers of two or more commands (two or more command IDs) that are included in the command category. In these embodiments, each command category can comprise a plurality of different and distinct commands, each command being associated with a unique command identifier (command ID). The set of command degrees 220 can specify a set of degrees associated with the set of commands 215 of the command category. Each command degree is associated with a particular command and specifies a predetermined degree that the data point representing the particular command is displayed within the circle chart of the command map GUI. Thus, the command degree specifies the position or orientation of the corresponding data point within the circle chart. Each command degree included in the set of command degrees 220 can specify a degree that is within the degree range 210 specified for the corresponding command category. For example, the degree range 210 for the model command category can specify a range of 0-45 degrees, whereby each degree specified in the set of command degrees 220 is within the range of 0-45 degrees. For example, model command category (Category1) can include Command1a having an associated degree of 1, Command1b having an associated degree of 3, Command1c having an associated degree of 3, etc. Thus, a first data point representing Command1a is displayed at the position or orientation of 1 degree within the circle chart, a second data point representing Command1b is displayed at the position or orientation of 2 degrees within the circle chart, and a third data point representing Command1c is displayed at the position or orientation of 3 degrees within the circle chart.

FIG. 3 is a conceptual diagram of a second section of a command map table, according to various embodiments. The second section 250 of the command map table 114 can include parameters related to a set of bands displayed within the circle chart of the command map GUI. In some embodiments, the circle chart further comprises a center point, an inner center circle, and a set of two or more bands. The inner center circle is concentric with the circle chart (is centered at the center point) and has a predetermined radius that is significantly smaller than the radius of the circle chart. Each band can comprise a circular band that is concentric with the center circle and represents a particular level of user proficiency regarding commands and command categories of the software application. The second section 250 can be used by the command map GUI engine 132 to generate and display the set of bands within the circle chart. The set of bands is described in further detail in relation to FIG. 7.

The second section 250 can include a plurality of entries 251 (such as 251a, 251b, 251c, etc.), each entry 251 containing parameters for a particular band. Each entry 251 for a band can include data fields for a band name 255, a width range 260, a range of invocation values 265, and a pixel/value ratio 270. The band name 255 can comprise the name or identifier of the band (such as Level 1, Level 2, Level 3, etc.). The width range 260 specifies a predetermined range that the band is displayed within the circle chart. The width range 260 can be defined by a start width (in terms of distance from the center circle) and an end width (in terms of distance from the center circle). Thus, the width range 260 can specify a radius range for the band, ranging from the inner circle of the band to the outer circle of the band. For each band, the field for the range of invocation values 265 specifies the range of invocation values that the band represents. The range of invocation values 265 can be defined by a start invocation value (corresponding to the start width of the band) and an end invocation value (corresponding to the end width of the band). The field for the pixel/value ratio 270 specifies a number of pixels corresponding to each invocation value within the band. As discussed below, the pixel/value ratio 270 can be used by the command map GUI engine 132 to determine a distance from the center circle for displaying the wedges and/or data points. In some embodiments, the pixel/value ratio 270 can be different for each band in the plurality of bands.

Figure 4:
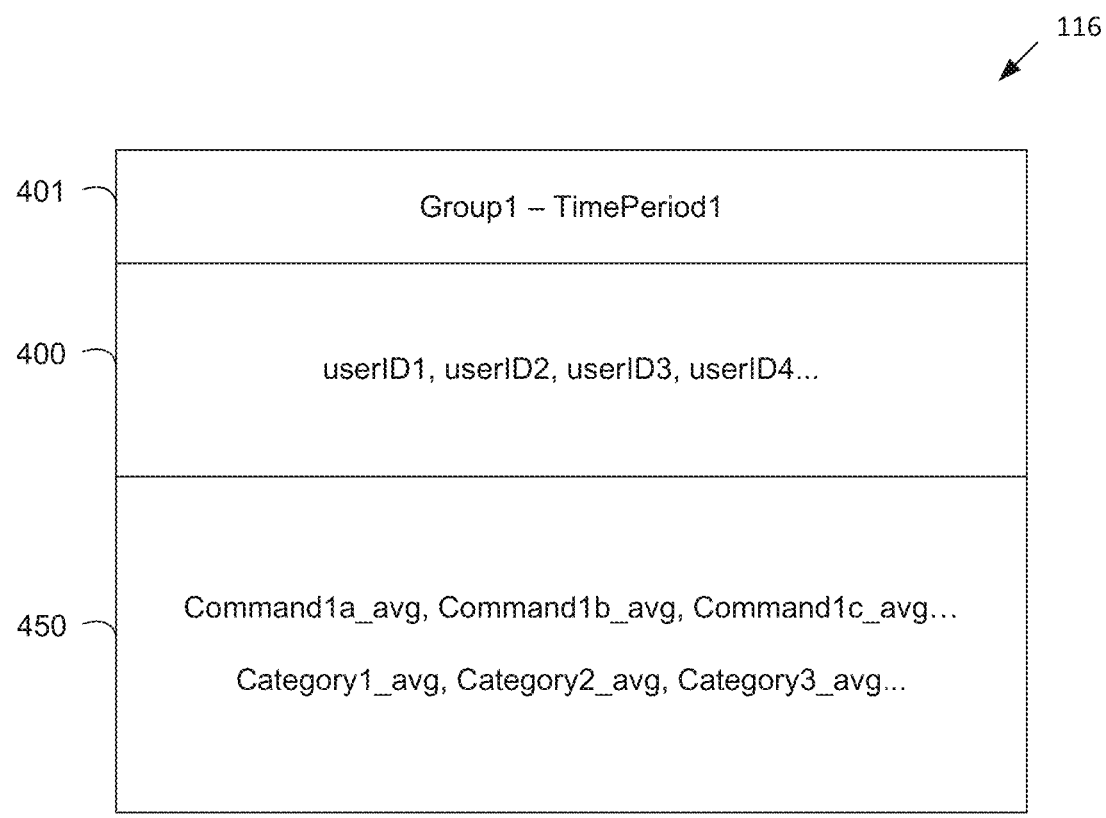
FIG. 4 is a conceptual diagram of a group table, according to various embodiments.

FIG. 4 is a conceptual diagram of a group table, according to various embodiments. In some embodiments, the server 110 stores a plurality of group tables 116, each group table 116 being associated with a particular group of users and a particular time period. A group can comprise two or more users that are grouped together based on some type of defining relationship. For example, a group can comprise users in a same industry field, department, project, team, company, classroom, and the like. For example, a group can comprise users having the same job title, job level, or educational background. In other embodiments, a group can be defined by any other type of relationship between the users. As shown, each group table 116 can comprise a field for the name or unique identifier 401 for the group. Each group table 116 can further comprise a first section 400 and a second section 450. The first section 400 can comprise a list of users included in the group, such as a list of user IDs and/or usernames (e.g., userID1, userID2, userID3, etc.).

The second section 450 of the group table 116 can include compiled command usage data for the users in the group and the particular time period, as processed by the command data engine 112 of the server 110. In some embodiments, the compiled command usage data can include a determined average amount of usage (average invocation value) for each command by the users in the group in the particular time period, such as Command1a_avg, Command1b_avg, Command1c_avg, etc. The compiled command usage data can further include a determined average amount of usage (average invocation value) for each command category across the users in the group within the particular time period, such as Category1_avg, Category2_avg, Category3_avg, etc. For example, the average amount of usage for a command category by the users in the group can be calculated by determining an average number of invocations for all commands in the command category for each user, adding/summing the average numbers for all users in the group, and dividing the summed total by the number of users in the group. As the command data engine 112 receives and processes command usage data from various clients 130, the command data engine 112 can repeatedly/continually update the compiled command usage data in the second section 450 accordingly.

A group table 116 can be initially generated and updated for a particular group and particular time period as specified by filtering parameters selected during an initiation process. The group table 116 can then be repeatedly/continually updated as new command usage data is received for the particular group and time period in real-time. In particular, the command data engine 112 continually receives and processes command usage data from various clients 130 and continually updates the compiled command usage data in real-time as new command usage data is continually received from the various clients 130. In response to receiving new command usage data of each new invoked command, the command data engine 112 updates the compiled command usage data in the second section 450 and pushes the updated compiled command usage data to one or more subscribing clients 130, which causes displaying of the updated compiled command usage data on the one or more subscribing clients 130.

Data Collection Methods

Figure 5:
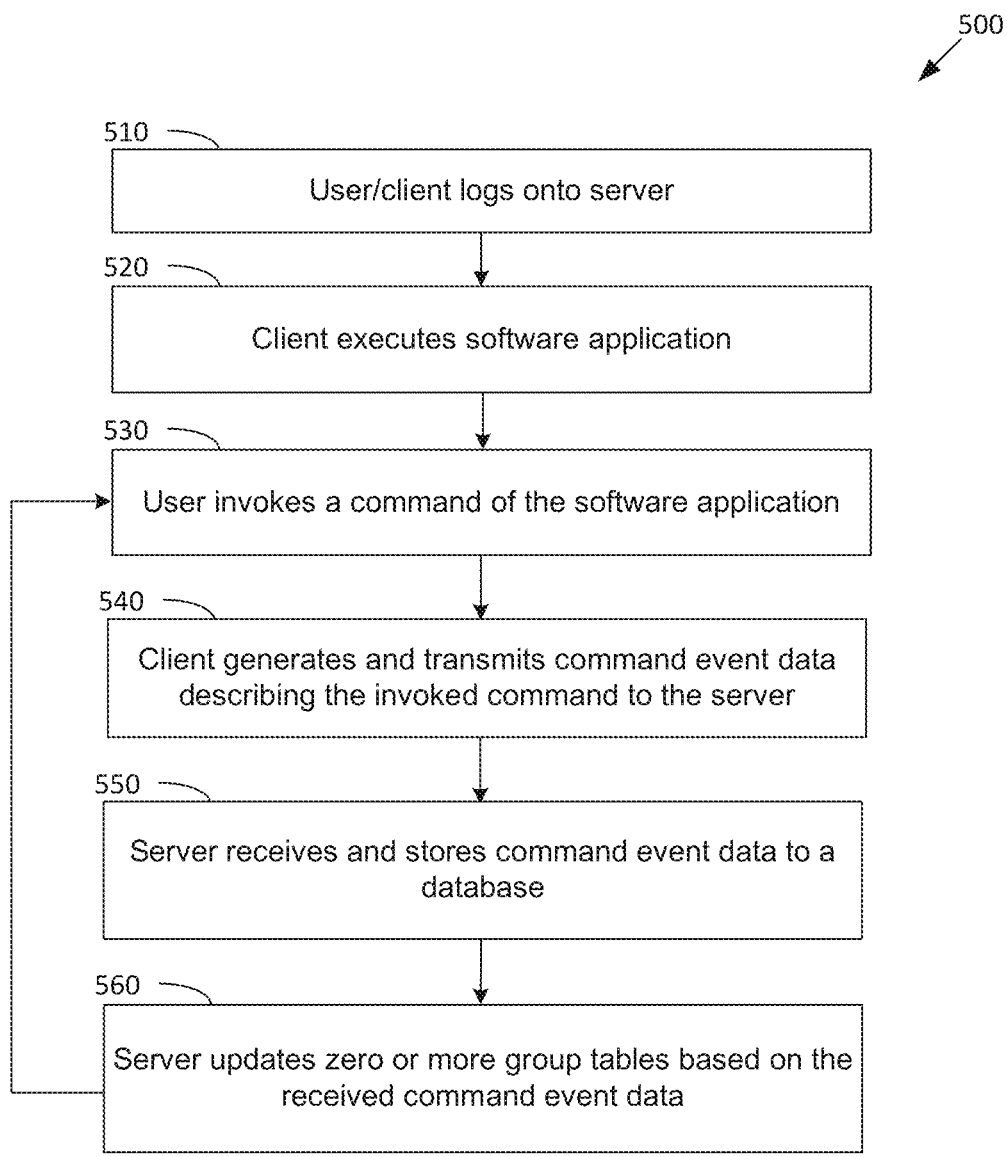
FIG. 5 is a flow diagram of method steps for collecting command usage data, according to various embodiments.

FIG. 5 is a flow diagram of method steps for collecting command usage data, according to various embodiments. Although the method steps are described in conjunction with the systems of FIGS. 1-4, persons skilled in the art will understand that the method steps can be performed in any order by any system. In some embodiments, the method 500 can be performed by the server 110 in conjunction with the plurality of clients 130 for receiving and storing command usage data 127 to the database 125.

The method 500 begins when a user/client 130 logs onto (at step 510) the command data engine 112 and the server 110, for example, using a user ID and password. The login process can be implemented by the interface engine 131 which interacts with the command data engine 112 via the network 120. The login process can trigger/initiate the generating and transmitting of command usage data by the interface engine 131 to the command data engine 112 via the network 120. The client 130 then executes (at step 520) a software application 138. A user invokes (at step 530) a command implemented by the software application. For each instance of each command that is invoked/executed by the user, the interface engine 131 generates (at step 540) command usage data describing the invoked command. The command usage data can include, for example, a session ID, user ID, command ID, timestamp, and/or other data describing the invoked command. The interface engine 131 also transmits (at step 540) the command usage data to the command data engine 112.

The command data engine 112 receives and stores (at step 550) the command usage data to a database 125 coupled to the server 110. The command data engine 112 can also update (at step 560) zero or more group tables 116 based on the received command usage data. If a particular group table 116 includes the user ID received in the command usage data, the command data engine 112 can update the compiled command usage data in the particular group table 116. Thus, the command data engine 112 can update the average amount of usage for the command (e.g., Command1a_avg) that is specified by the command ID received in the command usage data. The command data engine 112 can also update the average amount of usage for the command category (e.g., Category1_avg) that includes the command specified by the command ID received in the command usage data. The appropriate command and command category can be determined using the command map table 114.

The method 500 continues at step 530, whereby another instance of a command is invoked/executed by the user. The method 500 can be performed for each client 130 connected with the server 110.

In some embodiments, in response to receiving new command usage data for a new command invoked by a user included in the user entity (at step 550), the command data engine 112 automatically stores the new command usage data to the database 125, updates (at step 560) zero or more group tables 116 based on the new command usage data, and pushes/sends updated command usage data to one or more subscribing clients 130 in real-time. Each subscribing client 130 has requested to receive command usage data for the particular user entity. When the updated command usage data is for a group of users, the updated command usage data can include compiled command usage data for the group of users. These embodiments are discussed further below in relation to FIGS. 12-13.

Command Map GUI

During an initiation process, a client 130 executes the command map GUI engine 132 which generates the command map GUI. In some embodiments, the command map GUI enables a current user to view command usage data within a particular time period for one or more user entities selectable via a time data filter (discussed in relation to FIG. 6) and an entity data filter (discussed in relation to FIG. 7).

Figure 6:
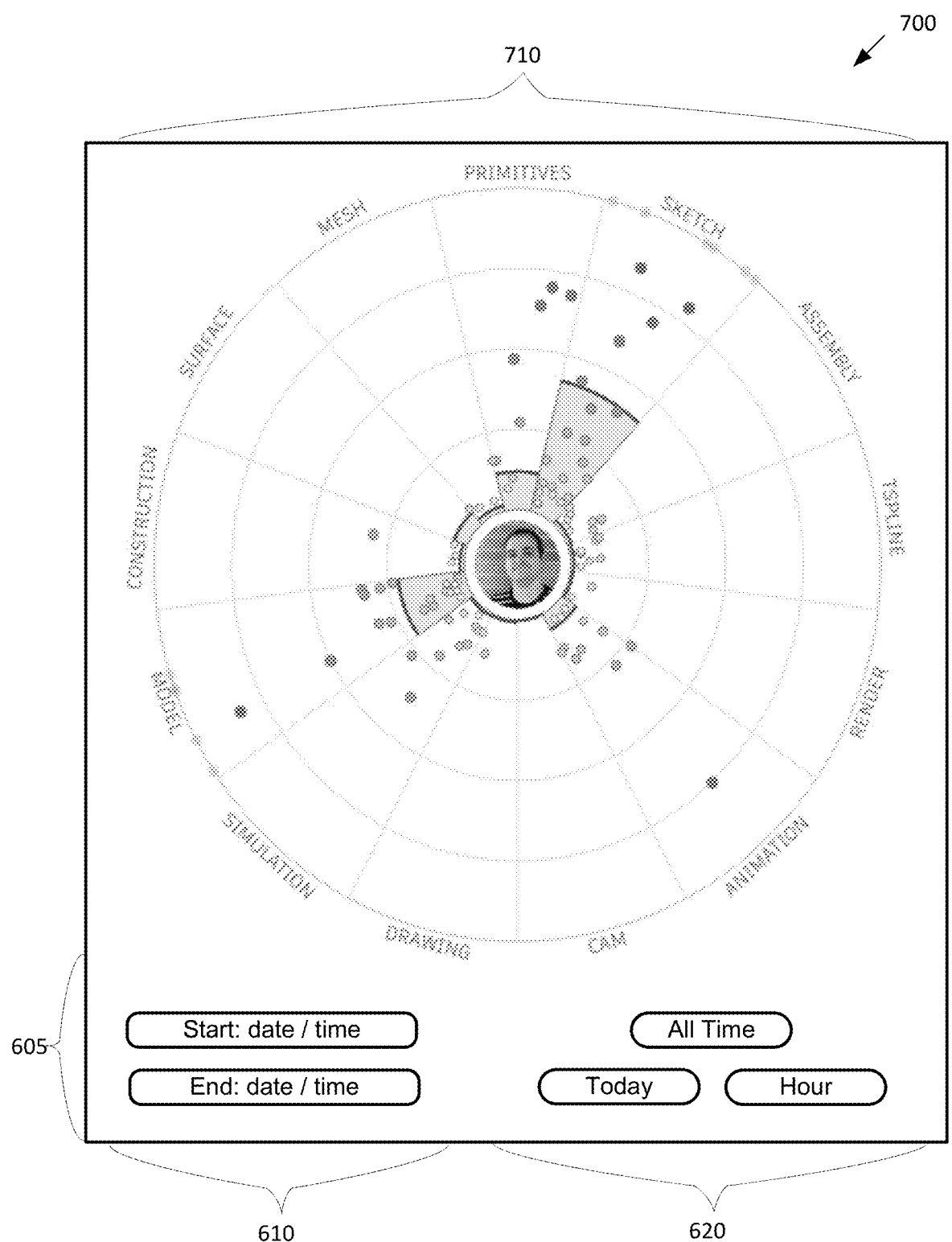
FIG. 6 is a screenshot of the command map GUI implemented in FIG. 1 for selecting a time period, according to various embodiments.

FIG. 6 is a screenshot of the command map GUI implemented in FIG. 1 for selecting a time period, according to various embodiments. As shown, the command map GUI 700 can display a time data filter 605 for selecting command usage data for a particular time period. The time data filter 605 can include a set of detailed selectors 610 and a set of quick selectors 610.

The set of detailed selectors 610 include a first input box for selecting a start of the time period (start day and time) and a second input box for selecting an end of the time period (end day and time). The set of detailed selectors 610 can be used to select a specific/exact time period for the command usage data that the current user/client wishes to view. For example, the set of detailed selectors 610 can be used to select a particular meeting, online class, or other such event for which the current user wishes to view command usage data of one or more entities. In some embodiments, the end of the time period (as specified by the end day and time) has not yet elapsed (i.e., the end day and time is after/subsequent to the current day and time). In these embodiments, the command map GUI 700 repeatedly/continually receives and displays updated command usage data in real-time or near real-time until the end of the time period elapses. Therefore, the most recent updated command usage data represents all command usage data for one or more selected entities from the start of the time period to the current time.

The set of quick selectors 620 include one or more selectable icons for easily selecting a predetermined time period for the command usage data that the current user wishes to view. For example, the set of quick selectors 620 can include an "All Time" icon for selecting all command usage data ever recorded for one or more selected entities up to a current day and time. Therefore, selection of the "All Time" icon would specify the start of the time period as the first initial day and time that command usage data was received and stored for the one or more selected entities, and specify the end of the time period as the current time. As another example, the set of quick selectors 620 can include a "Today" icon for selecting all command usage data recorded for one or more selected entities from the beginning of the current day up to the current time. Therefore, selection of the "Today" icon would specify the start of the time period as the beginning of the current day, such as the current day at 12:01 am or the current day at the start time of a typical workday (e.g., 8 am or 9 am). Selection of the "Today" icon would also specify the end of the time period as the end of the current day, such as the current day at midnight or the current day at the end time of a typical workday (e.g., 5 pm or 6 pm). As a further example, the set of quick selectors 620 can include an "Hour" icon for selecting all command usage data recorded for one or more selected entities from the beginning of the current hour up to the current time. Therefore, selection of the "Hour" icon would specify the start of the time period as the current day and the beginning of the current hour and specify the end of the time period as the current day and the end of the current hour.

In some embodiments, the end of the time period specified by each quick selectable icon 620 has not yet elapsed (i.e., the specified end day and time is after the current day and time). In these embodiments, the command map GUI 700 repeatedly/continually receives and displays updated command usage data in real-time until the end of the time period elapses. In other embodiments, the set of quick selectors 620 can include selectable icons for selecting other predetermined time periods, such as the last 2 hours, the current work week, or the like. In some embodiments, a predetermined time period can be selected by default, such as the predetermined time period associated with the "All Time" icon.

Figure 7:
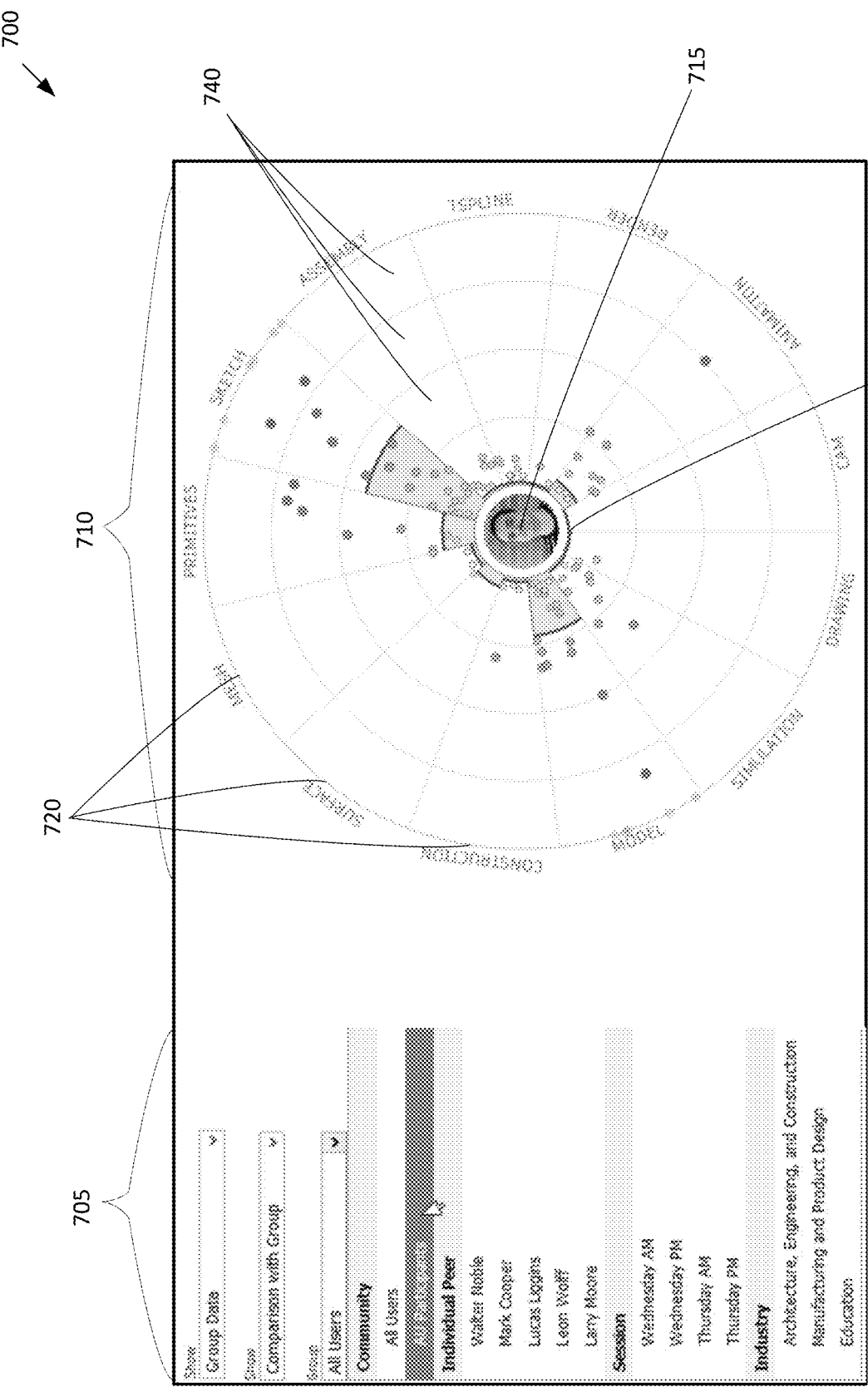
FIG. 7 is a screenshot of the command map GUI implemented in FIG. 1 for selecting user or group entities, according to various embodiments.

FIG. 7 is a screenshot of the command map GUI implemented in FIG. 1 for selecting user or group entities, according to various embodiments. As shown, the command map GUI 700 can display an entity data filter 705 for selecting command usage data for one or more entities. In some embodiments, via the entity data filter 705, a current user can select to view the command usage data for a first entity (user or a group). In other embodiments, via the entity data filter 705, the current user can select to view a comparison between the command usage data of the first entity (user or a group) and the command usage data of a second entity (user or a group).

A current user of the command map GUI 700 can select to view command usage data for one or more entities (selected via the entity data filter 705) for a particular time period (selected via the time data filter 605). For example, the current user can select to view the command usage data of a first entity comprising a user or group of users for a particular time period. During an initiation process for initiating the command map GUI, the interface engine 131 executing on the client 130 can submit a query to the command data engine 112 executing on the server 110 for the initial command usage data for the first entity and the particular time period. If the first entity is a single user, the command data engine 112 can respond to the query by retrieving initial command usage data for the specified user and time period from the database 125 and transmitting the command usage data to the interface engine 131 of the client 130. If the first entity is a specified group, the command data engine 112 can generate a group table 116 for the specified group and time period comprising compiled command usage data for the users in the group for the time period, and transmit the compiled command usage data to the interface engine 131. The compiled command usage data for the users in the group for the time period can include an average amount of usage (number of invocations) for each command by the users in the group within the time period and an average amount of usage (number of invocations) for each command category across the users in the group within the time period.

The command map GUI engine 132 then generates and displays the command map GUI based on the received initial command usage data and the command map table 114. Note that the initial command usage data can include no data depending on the selected filtering parameters. For example, if the first entity is selected and the time period associated with the "Today" icon is selected, the initial command usage data can include no data if none of the users included in the first entity has invoked a command during the selected time period.

After the initiation process implementing the initial command usage data, the command map interface GUI system enters a dynamic runtime mode whereby the command data engine 112 receives new command usage data from an invoking user/client within the first entity. In these embodiments, the invoking user/client has invoked a new command after the initiation process, whereby the new command usage data indicates how much the first entity has used the set of commands after the initial command usage data. In response to receiving the new command usage data, the command data engine 112 automatically updates the command usage data for the first entity based on the new command usage data, and pushes the updated command usage data to the current user/client. Therefore, the updated command usage data represents and/or includes the new command usage data which was not previously included in the initial command usage data. In response to receiving the new command usage data, the command data engine 112 also automatically pushes/sends the updated command usage data to the current user/client, which causes the command map GUI engine 132 to automatically generate and display the command map GUI 700 based on the updated command usage data for the first entity.

If the first entity is a single specified user, in response to receiving the new command usage data, the command data engine 112 automatically updates the command usage data for the specified user by associating the new command usage data with the specified user in the database. The command data engine 112 can then retrieve the updated command usage data by applying the current filter parameters (that select the specified user and the particular time period) which retrieves the command usage data for the specified user and the particular time period. As such, the updated command usage data can include the previous command usage data for the specified user (all command usage data recorded within the particular time period that is previous to the new command usage data) and the new command usage data for the specified user.

If the first entity is a specified group, in response to receiving the new command usage data, the command data engine 112 automatically updates the command usage data for the invoking user within the first entity by associating the new command usage data with the invoking user in the database, and also updates the compiled command usage data in the group table 116 corresponding to the specified group and time period based on the new command usage data. The command data engine 112 can then retrieve the updated command usage data for the specified group by retrieving the updated compiled command usage data from the group table 116 corresponding to the specified group and time period. As such, the updated command usage data can include compiled command usage data that is determined based on the previous command usage data for the specified group (all command usage data recorded within the particular time period that is previous to the new command usage data) and the new command usage data for the specified group.

As shown in FIG. 7, the command map GUI 700 also displays a circle chart 710 comprising a plurality of segments 720, each segment 720 corresponding to a particular command category of the software application. The plurality of segments 720 together span across the entire 360 degree range of the circle chart 710, each segment 720 comprising a predetermined sub-portion (slice) of the circle chart 710. Each segment 720 has an associated range of degrees (a predetermined sub-range of 360 degrees) specified in the command map table 114, which defines the position/orientation of the segment 720 within the circle chart 710. The command map GUI 700 can also display the name of the command category adjacent to the segment 720 corresponding to the command category.

The circle chart 710 can further include a center point 715 and an inner center circle 730 having a predetermined radius. As used herein, a "distance" can be measured in a number of pixels. A "distance from center" for a given point on the circle chart 710 can refer to a distance from the perimeter of the center circle 730 to the given point, the distance being measured by a line connecting the center point 715 to the given point. In these embodiments, each distinct distance from center represents a distinct invocation value. For example, an invocation value can indicate a total number of invocations of a command for a user, an average number of invocations of a command for a group, an average number of invocations for a command category for a user, or an average number of invocations for a command category for a group. Each different invocation value can correspond to a particular distance from center on the circle chart 710. In general, greater distances from the center circle 730 represent higher invocation values, so that as the distance from center increases, the value of the corresponding invocation number also increases. In other embodiments, however, greater distances from the center circle 730 can represent lower invocation values, so that as the distance from center increases, the value of the corresponding invocation number decreases.

The circle chart 710 can further include a plurality of bands 740. As discussed above, the command map table 114 can include parameters used for generating and displaying the set of bands 740. Each band 740 can comprise a circular band (having an inner radius and an outer radius) that is concentric with the center circle 730 and represents a particular level of user or group proficiency with commands and command categories of the software application (such as Level 1, Level 2, Level 3, etc.). Each band 740 in the plurality of bands 740 can have the same band width (thickness) in terms of pixels. Each band 740 also has a predetermined width range defined by a start width (in terms of distance from the center circle 730) and an end width (in terms of distance from the center circle 730). The distance from the center circle 730 of the start width defines the inner radius of the band and the distance from the center circle 730 of the end width defines the outer radius of the band.

Each band 740 also represents a predetermined range of invocation values. The range of invocation values can be defined by a start invocation value (represented by the start width at the inner radius of the band) and an end invocation value (represented by the end width at the outer radius of the band). In some embodiments, the different ranges of invocation values represented by the plurality of bands 740 can be determined in a non-linear fashion, such that each band 740 represents a different total number of invocation values. For example, band1/level 1 can represent 0 to 9 invocations, band2/level 2 can represent 10 to 149 invocations, and band3/level 3 can represent 150 to 299 invocations. In other embodiments, however, the different ranges of invocation values for the plurality of bands 740 can be determined in a linear fashion, such that each band 740 represents the same total number of invocation values. For example, each band 740 can represent 100 different invocation values so that band1/level 1 represents 0 to 99 invocations, band2/level 2 represents 100 to 199 invocations, and band3/level 3 represents 200 to 299 invocations. In general, the different ranges of invocation values for the plurality of bands 740 can be predetermined by software designers to produce the proper scaling for an overall range of invocation values represented by the plurality of bands 740.

In some embodiments, within the width range of each band 740, the relationship between the distance from the center circle 730 (distance from center) and the corresponding invocation value that the distance represents comprises a linear relationship. In these embodiments, as the distance from center within the width range of the band increases, the invocation value also increases in a linear fashion. The linear relationship between the distance from center and the corresponding invocation value within the band can be defined by a pixel/value ratio, as specified in the command map table 114. In some embodiments, the pixel/value ratio can be different for each band in the plurality of bands. The pixel/value ratio can specify a number of pixels (distance) associated with a single increment of the invocation value. The pixel/value ratio can be determined by dividing the band width (in pixels) by the total number of different invocation values that are represented by the band. For example, if each band comprises a band width of 100 pixels, and the band represents 0 to 9 invocations (comprising 10 different invocation values represented by the band), the pixel/value ratio equals 10 (100/10). This ratio indicates that within the band, each single increment of the invocation value corresponds to an increase in the distance from center of 10 pixels. The pixel/value ratio can be used by the command map GUI engine 132 to determine a distance from the center circle corresponding to various invocation values, for displaying wedges (representing command categories) and data points (representing commands) in the circle chart 710.

As discussed above, during the initiation process, the user can select to view the command usage data for a first entity for a particular time period via the entity data filter 705 and the time data filter 605, and the client 130 can request for and receive command usage data for the first entity for the particular time period from the server 110. The command map GUI engine 132 then generates and displays a plurality of data points on the circle chart 710 of the command map GUI based on the received command usage data and the command map table 114. In some embodiments, after the initiation process, the client 130 can also automatically receive updated command usage data for the first entity for the particular time period from the server 110 whenever the server 110 receives new command usage data for the first entity. The command map GUI engine 132 then generates and displays the plurality of data points on the circle chart 710 of the command map GUI based on the updated command usage data and the command map table 114.

Figure 8:
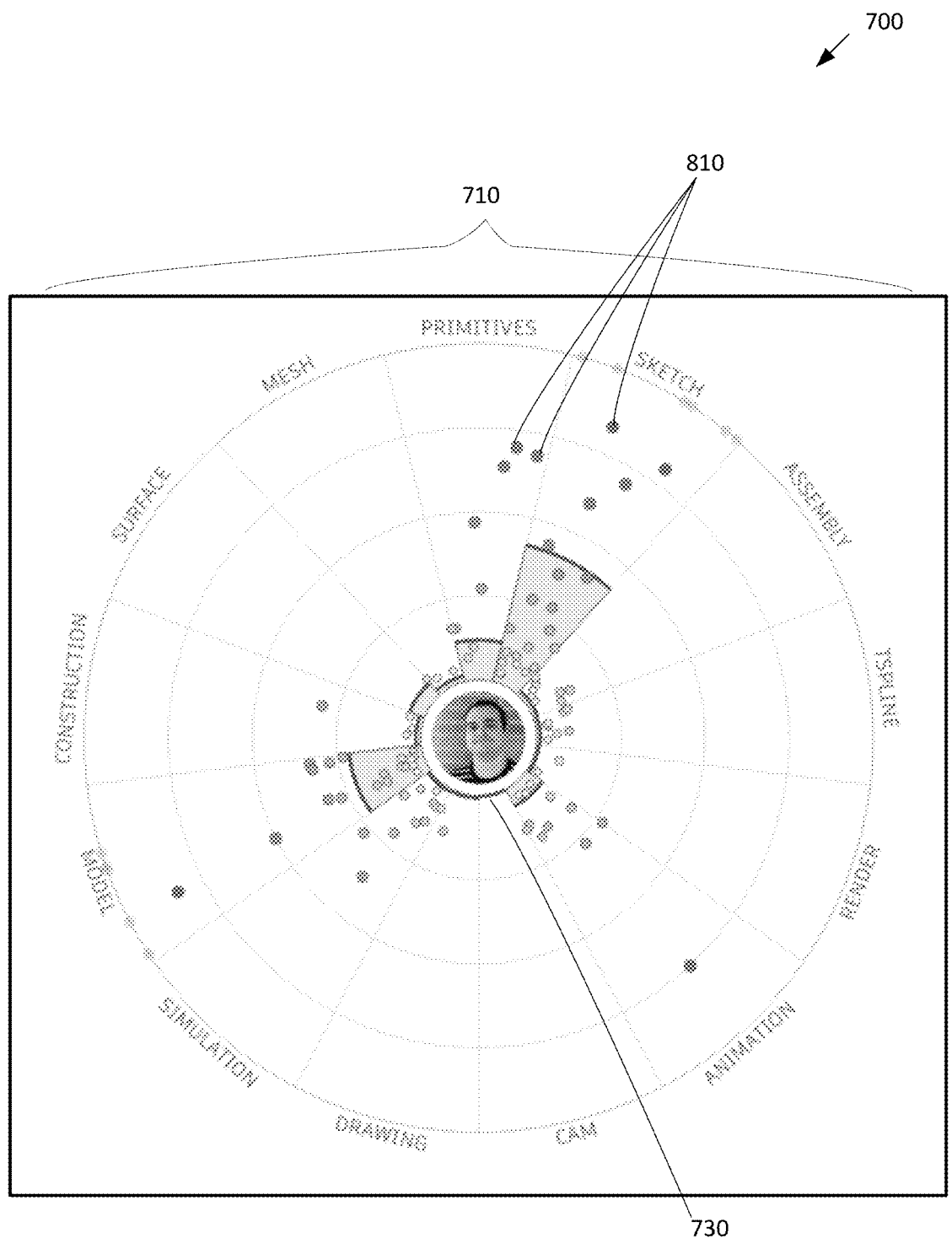
FIG. 8 is a screenshot of the command map GUI implemented in FIG. 1 displaying the command usage for a first entity, according to various embodiments.

FIG. 8 is a screenshot of the command map GUI implemented in FIG. 1 displaying the command usage for a first entity, according to various embodiments. As shown, the command map GUI 700 displays a plurality of data points 810 that graphically represent/illustrate the plurality of commands of the software application, each data point representing a particular command included within a particular command category. A data point that represents a command can be displayed within the segment that represents the particular command category that includes the command. The data point is displayed at a degree within the circle chart that is predetermined for the particular command, as specified in the command map table 114.

For a first entity comprising a specified user, the command map GUI engine 132 can analyze the received command usage data to determine an amount of usage (invocation value) for each command during the specified time period. The command map GUI engine 132 can do so using the command IDs included in the command usage data received for the specified user from the server 110. For a first entity comprising a specified group, the command map GUI engine 132 can analyze the received command usage data to determine an average amount of usage (invocation value) for each command by the users in the group during the specified time period. For each command having a determined invocation value, the command map GUI engine 132 can further determine a distance from center corresponding to the invocation value where the data point representing the command is to be displayed in the circle chart 710. The distance of a data point from the center circle 730 of the circle chart 710 visually represents/illustrates the amount of usage of the corresponding command for the first entity during the specified time period. For a first entity comprising a user, a data point can represent the total number of invocations for the corresponding command by the user during the specified time period. For a first entity comprising a group, the data point can represent the average number of invocations for the corresponding command by the users of the group during the specified time period.

The command map GUI engine 132 can use the command map table 114 to determine the distance from center for each invocation value determined for each command. To display a data point representing a particular command in the circle chart 710, the command map GUI engine 132 can first determine a distance from center corresponding to the determined invocation value. To do so, the command map GUI engine 132 can first determine which band 740 includes the invocation value by examining the range of invocation values represented by each band 740. The command map GUI engine 132 can then determine the distance from center within the particular band that corresponds to the particular invocation value. The command map GUI engine 132 can do so by determining a difference value between the particular invocation value and the start invocation value represented by the band 740, which equals the total number of value increments needed from the start invocation value to reach the particular invocation value. The command map GUI engine 132 can then multiply the pixel/value ratio for the band 740 by the difference value, which equals the pixel distance increase needed from the start width of the band 720 to reach the distance from center corresponding to the particular invocation value. The command map GUI engine 132 then adds the pixel distance increase to the start width of the band 720, which equals the distance from center corresponding to the particular invocation value.

For example, the invocation value for a particular command can equal 3, which is included in band1. Band1 represents 0 to 9 invocations, has a start width of 0 pixels, and a pixel/value ratio of 10. The difference value between 3 (the invocation value) and 0 (the start invocation value represented by band1) equals 3, and 10 (the pixel/value ratio for band1) multiplied by 3 (the difference value) equals 30. Adding 30 (the pixel distance increase) to 0 (the start width of band1) equals 30 pixels. Thus, the distance from center corresponding to the invocation value of 3 is determined to equal 30 pixels. Therefore, the command map GUI engine 132 displays a data point representing the particular command at a distance from center equal to 30 pixels and at a degree predetermined for the particular command, as specified in the command map table 114. The command map GUI engine 132 can also dynamically update the distance from center of each data point representing a command based on updated command usage data for the first entity received by the command map GUI engine 132 in real-time or near real-time.

The command map GUI 700 can also display a wedge within each corresponding segment 720 for representing the amount of usage of the command category corresponding to the segment 720 by the first entity during the time period. In some embodiments, the wedges representing command categories and the data points representing commands are displayed simultaneously. In other embodiments, the wedges representing command categories and the data points representing commands are not displayed simultaneously to avoid visual clutter in the circle chart 700.

Figure 9:
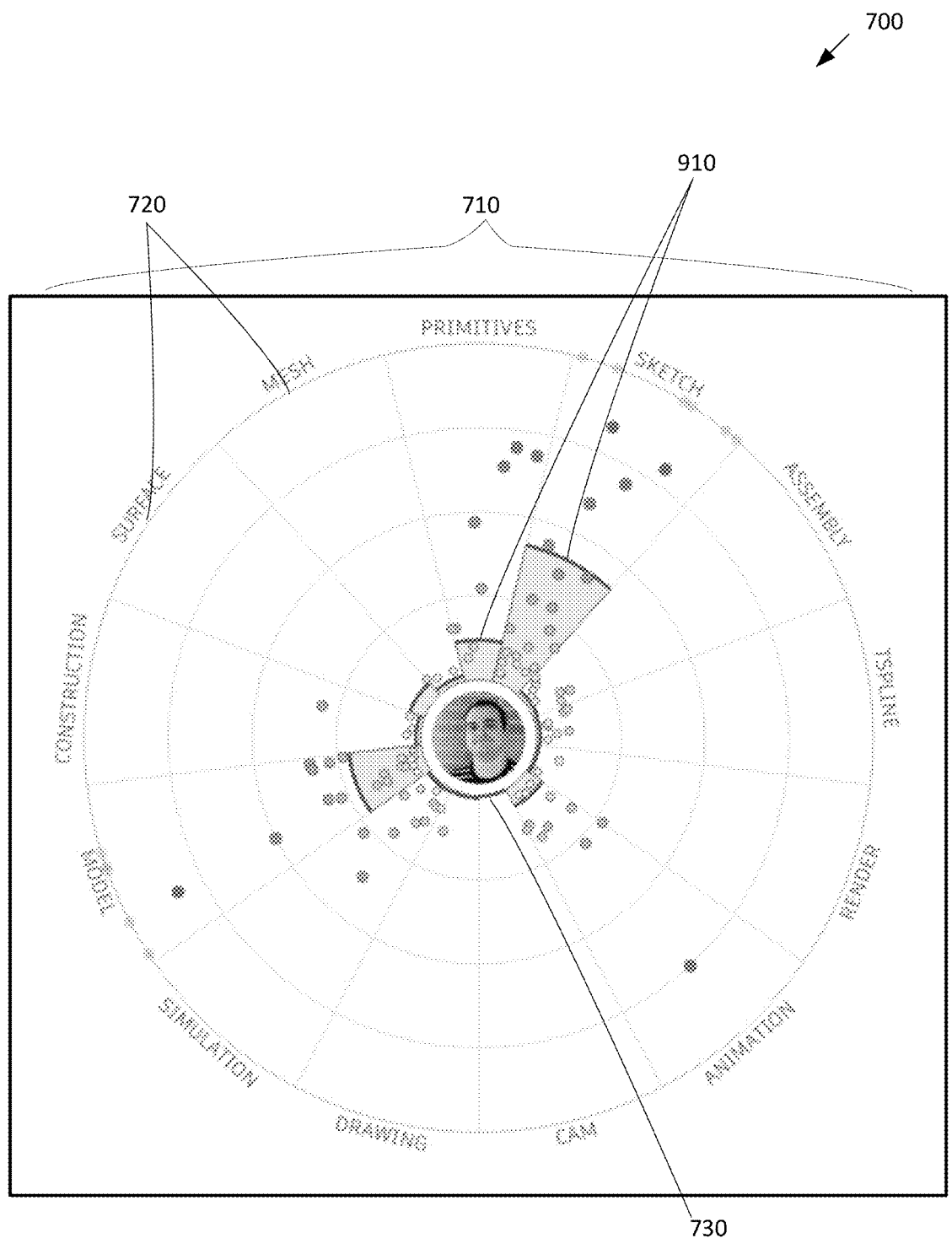
FIG. 9 is a screenshot of the command map GUI implemented in FIG. 1 displaying the command category usage for a first entity, according to various embodiments.

FIG. 9 is a screenshot of the command map GUI implemented in FIG. 1 displaying the command category usage for a first entity, according to various embodiments. As shown, the command map GUI 700 displays a plurality of wedges 910 that visually represent command categories of the software application, each wedge representing a particular command category comprising a plurality of different commands. A wedge 910 that represents a command category can be displayed within the segment 720 that corresponds to the command category at a degree range predetermined for the particular segment and command category, as specified in the command map table 114. The wedge can comprise a sub-portion or the entirety of the corresponding segment 720. Each wedge 910 can be displayed with a different appearance than the corresponding segment 720 to allow a user to easily distinguish between the wedge and the segment.

In particular, the size of each wedge 910 graphically represents/illustrates the amount of usage of the corresponding command category by the first entity during the time period, the larger the size of each wedge 910 representing a higher amount of usage of the corresponding command category. For a first entity comprising a user, the wedge 910 can represent the average number of invocations for the commands in the command category by the user during the time period. For a first entity comprising a group of users, the wedge 910 can represent the average number of invocations for the commands in the command category by the users of the group during the time period. Thus, each wedge 910 can visually represent the first entity's skill in a particular command category, whereas the plurality of wedges together visually represent the first entity's skill across all the command categories.

For a first entity comprising a specified user, the command map GUI engine 132 can analyze the received command usage data for the user to determine an average amount of usage (invocation value) for each command category. The command map GUI engine 132 can do so using the command IDs included in the command usage data and the command map table 114 to determine command categories for each invoked command. For a first entity comprising a specified group, the command map GUI engine 132 can analyze the received command usage data to determine an average amount of usage (invocation value) for the commands of the command category by the users in the group.

For each command category, the command map GUI engine 132 can further determine a distance from center corresponding to the invocation value determined for the command category. The same process described above for determining a distance from center for an invocation value determined for a command can be used to determine the distance from center for an invocation value determined for a command category. The distance from center determined for a particular command category determines the overall size or area of the wedge 910 representing the amount of usage of the particular command category. In particular, the area of each wedge 910 extends from the perimeter of the center circle 730 to the distance from the center circle 730 that is determined for the wedge 910, within the degree range that is predetermined for the wedge 910 and corresponding segment 720. The command map GUI engine 132 can also dynamically update the size and distance from center of each wedge representing a command category based on updated command usage data for the first entity received by the command map GUI engine 132 in real-time or near real-time.

For example, the invocation value for a particular command category can equal 3, which is included in band1. Band1 can represent 0 to 9 invocations, have a start width of 0 pixels, and a pixel/value ratio of 10. The difference value between 3 (the invocation value) and 0 (the start invocation value represented by band1) equals 3, and 10 (the pixel/value ratio for band1) multiplied by 3 (the difference value) equals 30. Adding 30 (the pixel distance increase) to 0 (the start width of band1) equals 30 pixels, which equals the distance from center corresponding to the invocation value of 3. Thus, the command map GUI engine 132 displays a wedge 910 representing the particular command category in the circle chart 710 that extends from the perimeter of the center circle 730 to the distance from center equal to 30 pixels, within the degree range predetermined for the wedge 910.

During the initiation process for the command map GUI, the user can also select, via the entity data filter 705 of the command map GUI 700, to view a comparison between the command usage data of a first entity and the command usage data of a second entity during the specified time period. In response, the client 130 queries and receives from the server 110 the initial command usage data for the first entity and the second entity. The client 130 then generates and displays the command map GUI based on the initial command usage data for the first and second entities and the command map table 114. In particular, the command map GUI 700 can display a plurality of data points, each data point representing the amount of usage of a particular command for the second entity. The command map GUI 700 can also update the display of each data point representing the amount of usage of a particular command for the second entity based on updated command usage data received for the second entity.

Figure 10:
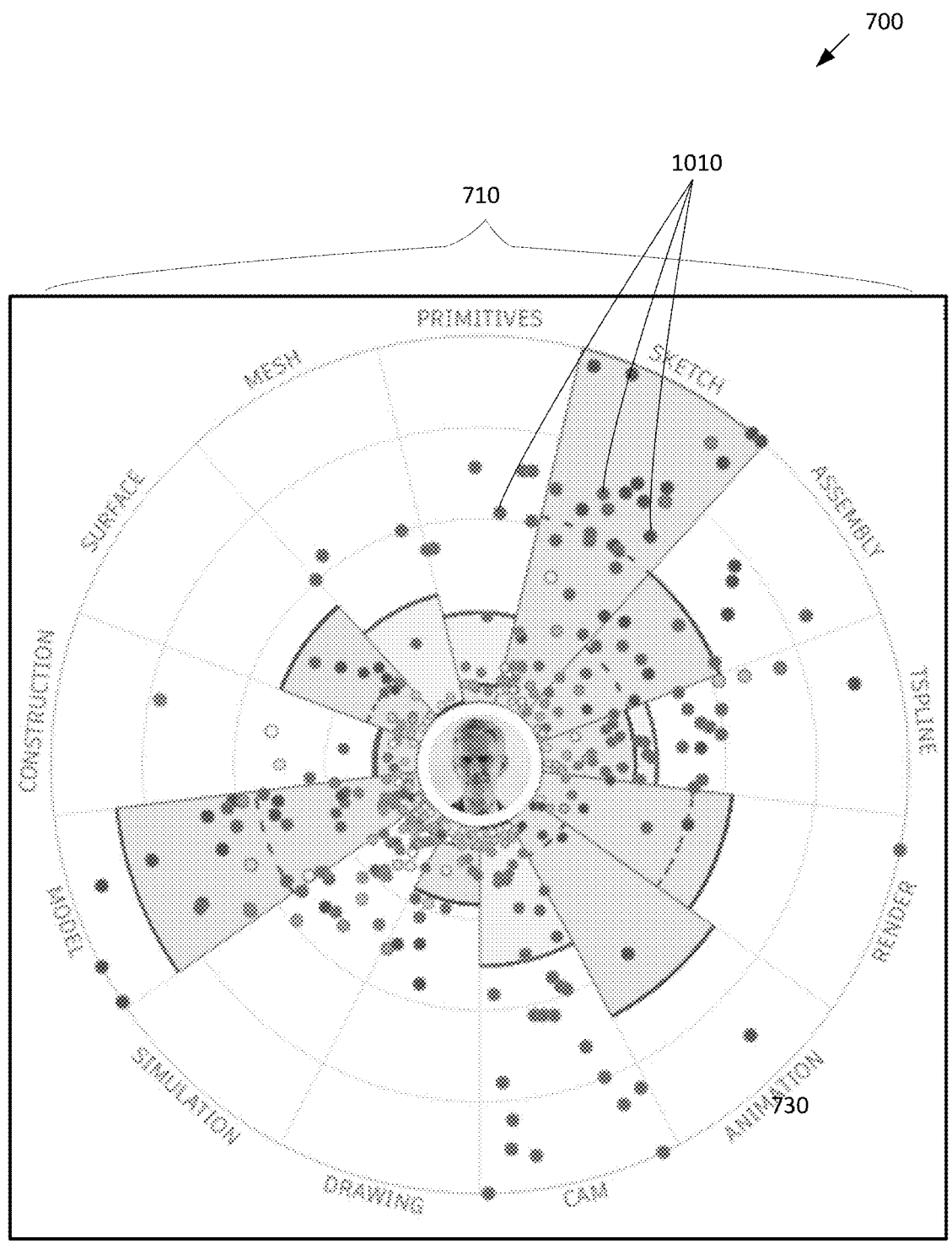
FIG. 10 is a screenshot of the command map GUI implemented in FIG. 1 displaying a comparison between command usage by a first entity and a second entity, according to various embodiments.

FIG. 10 is a screenshot of the command map GUI implemented in FIG. 1 displaying a comparison between command usage by a first entity and a second entity, according to various embodiments. As shown, the command map GUI 700 displays a plurality of data points 1010 that visually represent the command usage for a second entity. In some embodiments, the command map GUI 700 does not display data points for the first entity to avoid visual clutter in the command map GUI 700. In other embodiments, however, the command map GUI 700 displays a plurality of data points 1010 that visually represent the command usage for the first entity, and does not display data points for the second entity to avoid visual clutter in the command map GUI 700.

In these embodiments, the process for displaying the data points for the first entity or second entity is similar to the process for displaying the data points for the first entity as described above in relation to FIG. 8. However, in further embodiments, a data point 1010 representing a particular command can be displayed with at least two different and distinct appearances to indicate whether the first entity is using particular command more than or less than the second entity. For example, a data point 1010 representing a particular command can be displayed with a first appearance to indicate that the invocation value associated with the particular command for the first entity is greater than the invocation value associated with the particular command for the second entity. A data point 1010 representing a particular command can be displayed with a second appearance to indicate that the invocation value associated with the particular command for the first entity is less than the invocation value associated with the particular command for the second entity, wherein the second appearance is different than the first appearance in at least one visual characteristic. If an entity comprises a user, the invocation value for the particular command for the user can comprise the total number of times the particular command was invoked by the user. If an entity comprises a group, the invocation value for the particular command for the group can comprise an average number of times the particular command was invoked by the users of the group.

For example, a data point 1010 representing a particular command can be colored blue to indicate that the invocation value associated with the particular command for the first entity is greater than the invocation value associated with the particular command for the second entity. A data point 1010 representing a particular command can be colored red to indicate that the invocation value associated with the particular command for the first entity is less than the invocation value associated with the particular command for the second entity. In these embodiments, the data points can be displayed with the different appearances to allow easy visual comparison of the command usage between the first and second entities.

In some embodiments, the command map GUI 700 can also automatically and dynamically update the visual appearance of each data point for the second entity based on updated command usage data received for the first entity or the second entity. In these embodiments, the command map GUI 700 automatically and dynamically updates the visual appearance of each data point for the second entity based on the real-time (most current) command usage data for the first entity and the second entity.

Figure 11:
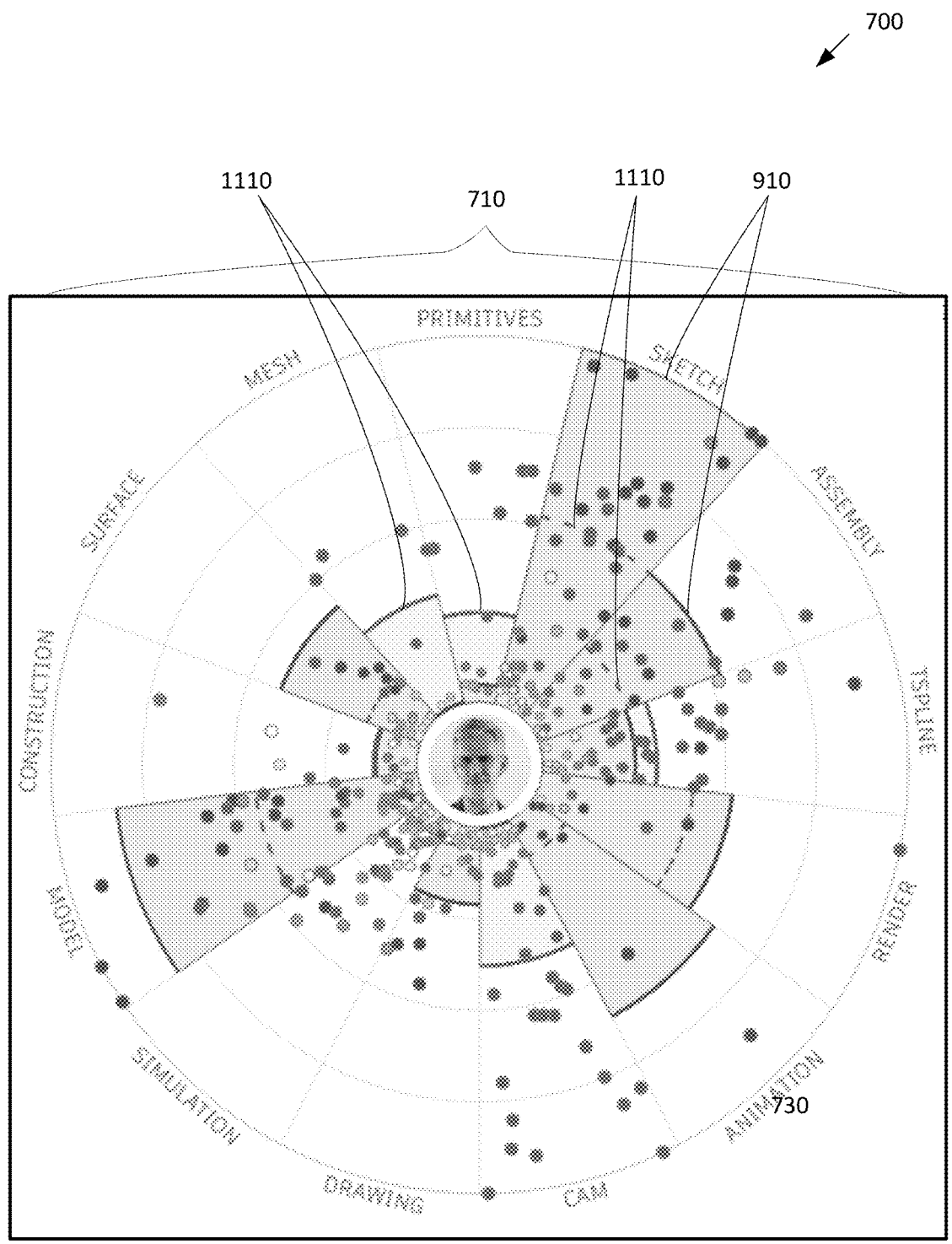
FIG. 11 is a screenshot of the command map GUI implemented in FIG. 1 illustrating a comparison between command category usage by a first entity and a second entity, according to various embodiments.

To further illustrate the comparison between the command usage data of the second entity and the first entity, the command map GUI can also display a plurality of wedges representing the amount of command category usage by the second entity that overlap the plurality of wedges representing the amount of command category usage by the first entity. FIG. 11 is a screenshot of the command map GUI implemented in FIG. 1 illustrating a comparison between command category usage by a first entity and a second entity, according to various embodiments. As shown, the command map GUI can display a first wedge 910 inside each segment 720 representing the amount of usage of the corresponding command category by the first entity and a second wedge 1110 inside each segment 720 for representing the amount of usage of the corresponding command category by the second entity. Thus, the first wedge 910 and the second wedge 1110 can be overlaid on top of each other within the corresponding segment 720. However, the second wedge 1110 representing the command category usage of the second entity can be displayed with a different appearance than the first wedge 910 representing the command category usage of the first entity to visually distinguish the second wedge from the first wedge. In these embodiments, the first and second wedges can be displayed in a segment simultaneously to allow easy visual comparison between the command category usage by the first and second entities.

The command map GUI can automatically and dynamically update the size of each wedge to illustrate the most current amount of usage of the corresponding command category by the first entity and the second entity based on the updated command usage data received for the first entity or the second entity in real-time or near real-time. In these embodiments, the command map GUI can automatically and dynamically update the size of each wedge based on the real-time (most current) command usage data for the first entity and the second entity.

Dynamically Generating and Displaying a Command Map GUI

Figure 12:
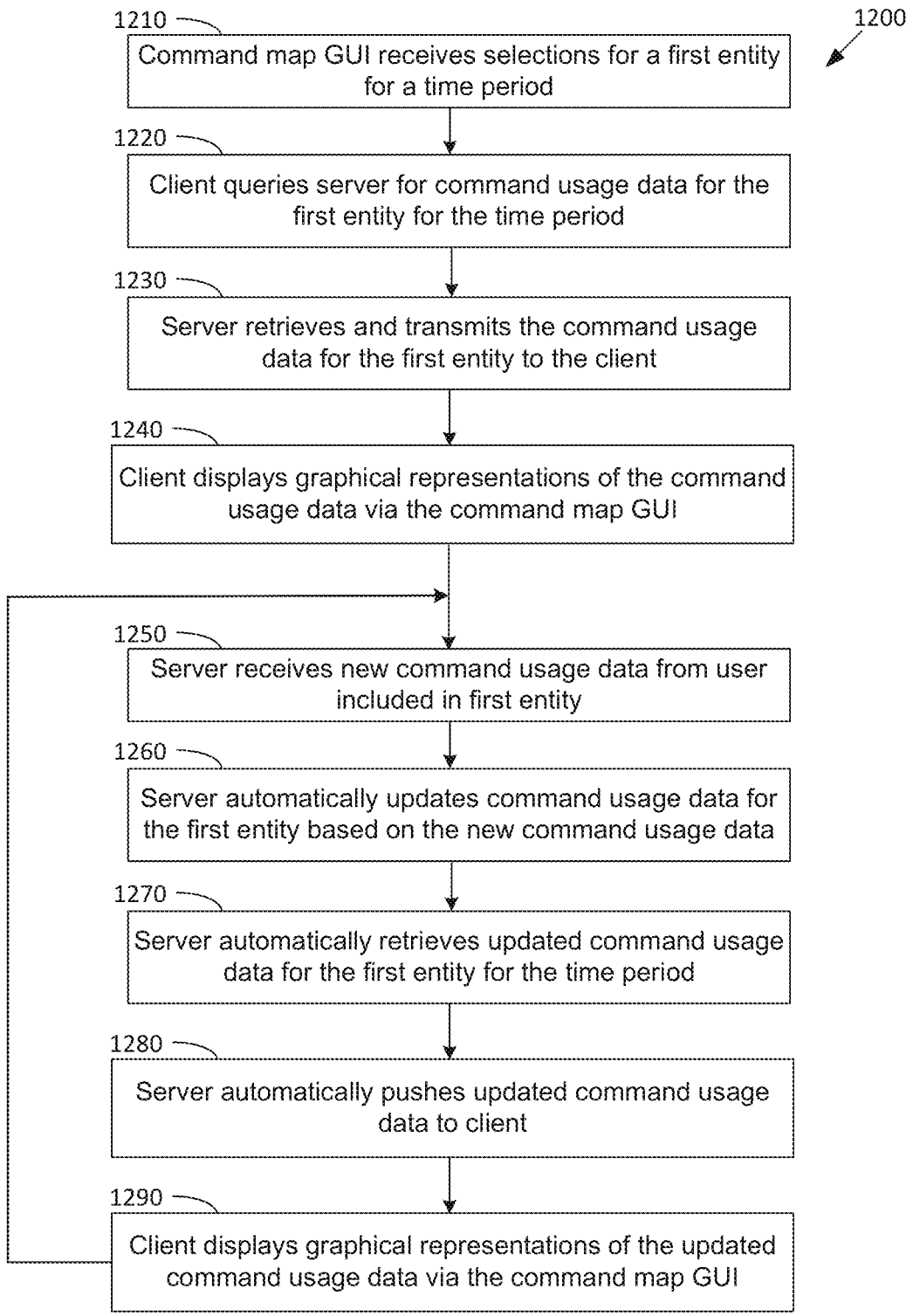
FIG. 12 is a flow diagram of method steps for dynamically generating a command map GUI that displays command usage data for a first entity in real-time or near real-time, according to various embodiments.

FIG. 12 is a flow diagram of method steps for dynamically generating a command map GUI that displays command usage data for a first entity in real-time or near real-time, according to various embodiments. Although the method steps are described in conjunction with the systems of FIGS. 1-4, 6-11, and 14-17, persons skilled in the art will understand that any system configured to perform the method steps, in any order, is within the scope of the various embodiments. In some embodiments, the method 1200 can be performed by the command map GUI engine 132 executing on the client 130 in conjunction with the command data engine 112 executing on the server 110.

The method 1200 begins when the command map GUI 700 receives (at step 1210) user selections for viewing the command usage data of a first entity (user or group) for a particular time period during an initiation process. For example, the command map GUI 700 can receive user selections of the first entity via the entity data filter 705 and the time period via the time data filter 605. In some embodiments, the end of the specified time period has not yet elapsed (i.e., the end day and time is after the current day and time). In response, the command map GUI engine 132 queries (at step 1220) the command data engine 112 for the command usage data for the first entity for the particular time period.

In response to the query, the command data engine 112 retrieves (at step 1230) the initial command usage data for the first entity for the time period and transmits the initial command usage data in a response to the command map GUI engine 132. If the first entity is a user, the command data engine 112 retrieves and transmits the command usage data 127 for the user for the time period from the database 125 to the command map GUI engine 132. If the first entity is a group, the command data engine 112 retrieves compiled command usage data from a group table 116 corresponding to the group for the time period and transmits the compiled command usage data to the command map GUI engine 132. For example, the compiled command usage data for the group can include an average amount of usage (number of invocations) for each command by the users in the group and an average amount of usage (number of invocations) for each command category across the users in the group.

The command map GUI engine 132 receives (at step 1240) the initial command usage data for the first entity for the time period and generates and displays the command map GUI based on the initial command usage data and the command map table 114. In some embodiments, the command map GUI 700 displays one or more graphical representations of the initial command usage data via a circle chart 710. In these embodiments, the command map GUI 700 displays a circle chart 710 comprising a plurality of segments 720 representing a plurality of command categories, a center circle 730, and a plurality of circular bands concentric to the center circle 730. The command map GUI 700 also displays a plurality of data points on the circle chart 710 that visually illustrate the amount of usage for a plurality of commands by the first entity and a plurality of wedges on the circle chart 710 that visually illustrate the amount of usage for a plurality of command categories by the first entity. In other embodiments, the command map GUI 700 displays one or more graphical representations of the received command usage data via a non-circular chart or graph. For example, the graphical representations of the received command usage data can be displayed using conventional bars, lines, or grids.

After the initiation process is performed (in steps 1210 through 1240), the command data engine 112 executing on the server 110 receives (at step 1250) new command usage data from an invoking user/client included in the first entity. At step 1250, the invoking user in the first entity invokes/executes a new command of the software application after the initiation process is performed and transmits new command usage data for the new command to the server 110. The new command comprises a newly invoked instance of a particular command of the software application that has not been previously recorded by the server 110 (i.e., the new command usage data for the new command has not been previously received and stored to the server 110). Therefore, the new command usage data is not included in the initial command usage data.

In response to receiving the new command usage data at step 1250, the server 110 automatically updates (at step 1260) the command usage data for the first entity based on the new command usage data. If the first entity is a single specified user, the server 110 automatically updates the command usage data for the specified user by associating the new command usage data with the specified user in the database. If the first entity is a specified group, the server 110 automatically updates the command usage data for the invoking user in the first entity by associating the new command usage data with the invoking user in the database, and also updates the compiled command usage data in the group table 116 corresponding to the specified group and time period based on the new command usage data.

In response to receiving the new command usage data at step 1250, the server 110 also automatically retrieves (at step 1270) the updated command usage data for the first entity for the time period. If the first entity is a single specified user, the server 110 automatically retrieves the updated command usage data by applying the current filter parameters (that select the specified user and the time period) which retrieves the command usage data for the specified user for the time period from the database. As such, the updated command usage data includes the previous command usage data for the specified user (all command usage data within the particular time period that is recorded previous to recording the new command usage data) and the new command usage data for the specified user. If the first entity is a specified group, the server 110 automatically retrieves the updated command usage data for the specified group by retrieving the updated compiled command usage data from the group table 116 corresponding to the specified group and time period. As such, the updated command usage data includes compiled command usage data that is determined based on the previous command usage data for the specified group (all command usage data within the particular time period that is recorded previous to recording the new command usage data) and the new command usage data for the specified group.

In response to receiving the new command usage data at step 1250, the server 110 also automatically pushes/sends (at step 1280) the updated command usage data to the command map GUI engine 132. As such, the server 110 generates and transmits the updated command usage data in response to receiving any new command usage data from any invoking user of the first entity without having to receive a request/query from the command map GUI engine 132 to send updated command usage data to the command map GUI engine 132. Therefore, pulling/requesting of the updated command usage data from the server 110 is not required by the command map GUI engine 132.

The command map GUI engine 132 then receives (at step 1290) the updated command usage data for the first entity for the time period and automatically updates the display of the command map GUI based on the updated command usage data in response to receiving the updated command usage data. In particular, the command map GUI engine 132 displays one or more graphical representations of the updated command usage data via the command map GUI 700. In some embodiments, the command map GUI 700 displays one or more graphical representations of the updated command usage data via the circle chart 710. In other embodiments, the command map GUI 700 displays one or more graphical representations of the updated command usage data via a non-circular chart or graph. For example, the graphical representations of the updated command usage data can be displayed using conventional bars, lines, or grids. As such, receiving the pushed updated command usage data at the command map GUI engine 132 causes the command map GUI engine 132 to automatically generate and display graphical representations of the updated command usage data via the command map GUI 700.

The method 1200 then continues at step 1250 whereby the command data engine 112 executing on the server 110 receives a next new command usage data from an invoking user included in the first entity.

Figure 13:
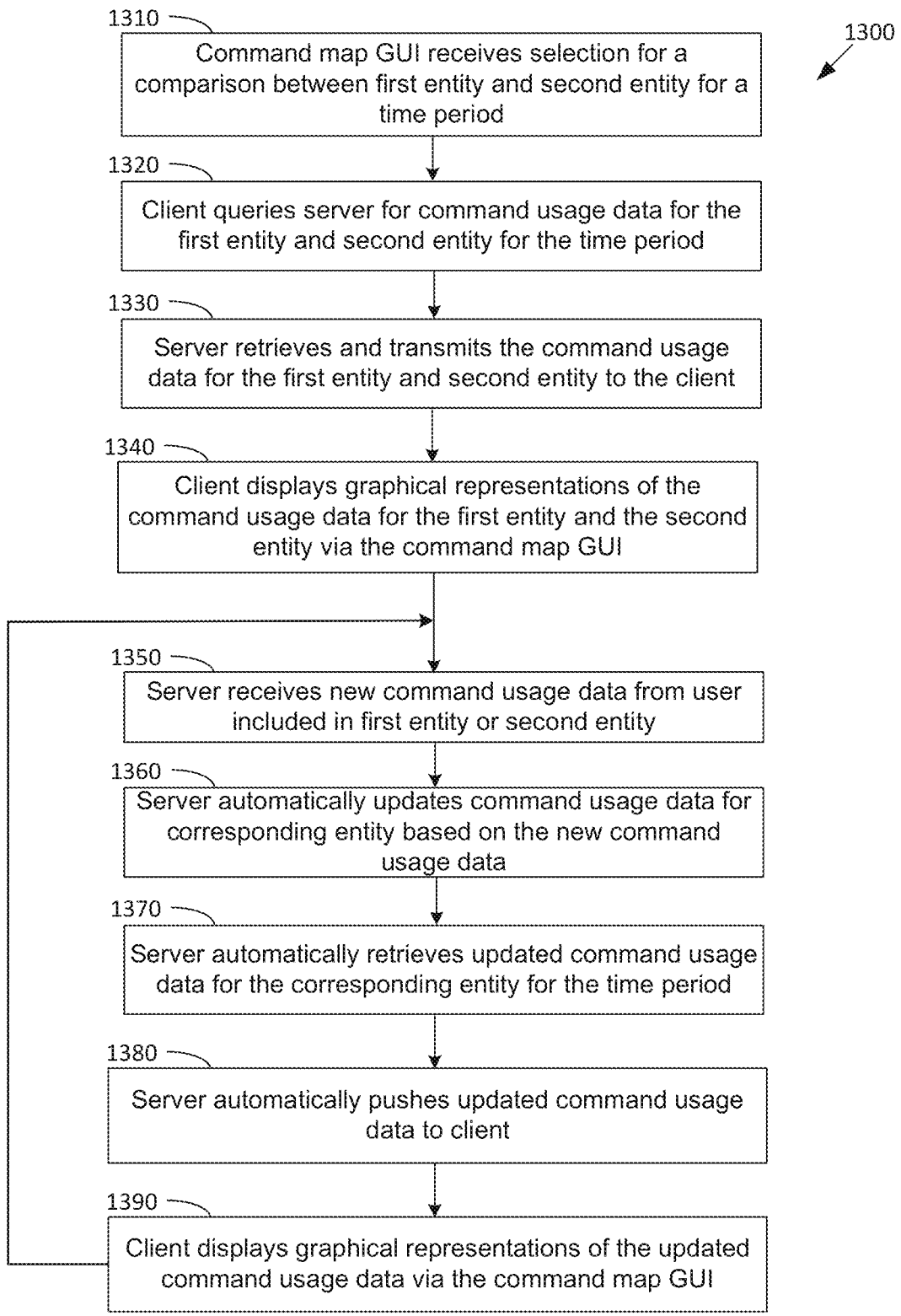
FIG. 13 is a flow diagram of method steps for dynamically generating a command map GUI that displays a comparison between command usage data for a first entity and a second entity in real-time or near real-time, according to various embodiments.

FIG. 13 is a flow diagram of method steps for dynamically generating a command map GUI that displays a comparison between command usage data for a first entity and a second entity in real-time or near real-time, according to various embodiments. Although the method steps are described in conjunction with the systems of FIGS. 1-4, 6-11, and 14-17, persons skilled in the art will understand that any system configured to perform the method steps, in any order, is within the scope of the present embodiments. In some embodiments, the method 1300 can be performed by the command map GUI engine 132 executing on the client 130 in conjunction with the command data engine 112 executing on the server 110.

The method 1300 begins when the command map GUI receives (at step 1310) a user selection to view a comparison between the command usage data of a first entity (user or group) and a second entity (user or group) for a particular time period during an initiation process. For example, the command map GUI 700 can receive user selections of the first entity and the second entity via the entity data filter 705 and the time period via the time data filter 605. In some embodiments, the end of the specified time period has not yet elapsed (i.e., the end day and time is after the current day and time). In response, the command map GUI engine 132 queries (at step 1320) the command data engine 112 for the command usage data for the first entity and the second entity for the particular time period.

In response to the query, the command data engine 112 retrieves (at step 1330) the command usage data for the first entity and the second entity for the time period and transmits the command usage data to the command map GUI engine 132. If an entity is a user, the command data engine 112 retrieves and transmits command usage data 127 for the user for the time period from the database 125 to the command map GUI engine 132. If an entity is a group, the command data engine 112 retrieves compiled command usage data from a group table 116 corresponding to the group for the time period and transmits the compiled command usage data in a response to the command map GUI engine 132.

The command map GUI engine 132 receives (at step 1340) the command usage data for the first entity and the second entity for the time period and generates and displays the command map GUI based on the received command usage data and the command map table 114. In some embodiments, the command map GUI 700 displays graphical representations of the received command usage data via a circle chart 710. In these embodiments, the command map GUI displays a circle chart 710 comprising a plurality of segments 720 representing a plurality of command categories, a center circle 730, and a plurality of circular bands concentric to the center circle 730. The command map GUI displays a plurality of data points on the circle chart 710 that visually illustrate the amount of usage for a plurality of commands by the first entity or the second entity. The command map GUI further displays a first set of wedges on the circle chart 710 that visually illustrate the amount of usage for a plurality of command categories by the first entity for the time period and a second set of wedges on the circle chart 710 that visually illustrate the amount of usage for the plurality of command categories by the second entity for the time period. In other embodiments, the command map GUI 700 displays graphical representations of the received command usage data via a non-circular chart or graph.

After the initiation process is performed (in steps 1310 through 1340), the command data engine 112 executing on the server 110 receives (at step 1350) new command usage data from an invoking user included in the first entity or the second entity. At step 1350, the invoking user in the first entity or the second entity invokes/executes a new command of the software application after the initiation process is performed and transmits new command usage data for the new command to the server 110. The new command comprises a newly invoked instance of a particular command of the software application that has not been previously recorded by the server 110 (i.e., the new command usage data for the new command has not been previously received and stored to the server 110).

In response to receiving the new command usage data at step 1350, the server 110 automatically updates (at step 1360) the command usage data for the corresponding entity (first entity or the second entity) based on the new command usage data. The corresponding entity comprises the entity that includes the invoking user. If the corresponding entity is a single specified user, the server 110 automatically updates the command usage data for the specified user by associating the new command usage data with the specified user in the database. If the corresponding entity is a specified group, the server 110 automatically updates the command usage data for the invoking user by associating the new command usage data with the invoking user in the database, and also updates the compiled command usage data in the group table 116 corresponding to the specified group and time period based on the new command usage data.

In response to receiving the new command usage data at step 1350, the server 110 also automatically retrieves (at step 1370) the updated command usage data for the corresponding entity (first entity or second entity) for the time period. If the corresponding entity is a single specified user, the server 110 automatically retrieves the updated command usage data by applying the current filter parameters (that select the specified user and the time period) which retrieves the command usage data for the specified user for the time period from the database. As such, the updated command usage data includes the previous command usage data for the specified user (all command usage data within the particular time period that is recorded previous to recording the new command usage data) and the new command usage data for the specified user. If the corresponding entity is a specified group, the server 110 automatically retrieves the updated command usage data for the specified group by retrieving the updated compiled command usage data from the group table 116 corresponding to the specified group and time period. As such, the updated command usage data includes compiled command usage data that is determined based on the previous command usage data for the specified group (all command usage data within the particular time period that is recorded previous to recording the new command usage data) and the new command usage data for the specified group.

In response to receiving the new command usage data at step 1350, the server 110 also automatically pushes/sends (at step 1380) the updated command usage data of the corresponding entity (first entity or the second entity) to the command map GUI engine 132. As such, the server 110 generates and transmits the updated command usage data in response to receiving any new command usage data from any invoking user of the first entity or the second entity without having to receive a request/query from the command map GUI engine 132 to send updated command usage data to the command map GUI engine 132. Therefore, pulling/requesting of the updated command usage data from the server 110 is not required by the command map GUI engine 132.

The command map GUI engine 132 then receives (at step 1390) the updated command usage data for the corresponding entity (first entity or the second entity) for the time period and automatically updates the display of the command map GUI based on the updated command usage data in response to receiving the updated command usage data. In particular, the command map GUI engine 132 displays updated graphical representations of the updated command usage data via the command map GUI 700. In some embodiments, the command map GUI 700 displays graphical representations of the updated command usage data via the circle chart 710. In other embodiments, the command map GUI 700 displays graphical representations of the updated command usage data via a non-circular chart or graph. As such, receiving the pushed updated command usage data at the command map GUI engine 132 causes the command map GUI engine 132 to automatically generate and display graphical representations of the updated command usage data via the command map GUI 700.

The method 1300 then continues at step 1350 whereby the command data engine 112 executing on the server 110 receives a next new command usage data from an invoking user included in the first entity or the second entity.

Animation Display Mode

As described above, each data point displayed on the circle chart 710 corresponds to a particular command and a particular entity, whereby the distance/position of the data point on the circle chart 710 illustrates and represents an amount of usage of the particular command by the particular entity. The command map GUI engine 132 configures the command map GUI 700 to automatically and dynamically update the distance/position of a data point of the circle chart 710 to illustrate the most current amount of usage of the corresponding command based on updated command usage data received for the corresponding entity in real-time or near real-time. For example, the updated command usage data can be generated based on new command usage data that is associated with a first command that is represented by a first data point. Therefore, the updated command usage data automatically and dynamically updates the distance/position of the first data point of the circle chart 710. In some embodiments, the command map GUI engine 132 can also configure the command map GUI 700 to enable an animation display mode that displays visuals or an animation (such as a "comet" animation) that graphically illustrates the dynamic updating (movement) of the distance/position of a data point of the circle chart 710 based on received updated command usage data. The animation display mode is discussed in relation to FIGS. 14A-C and 15.

Figure 14A:
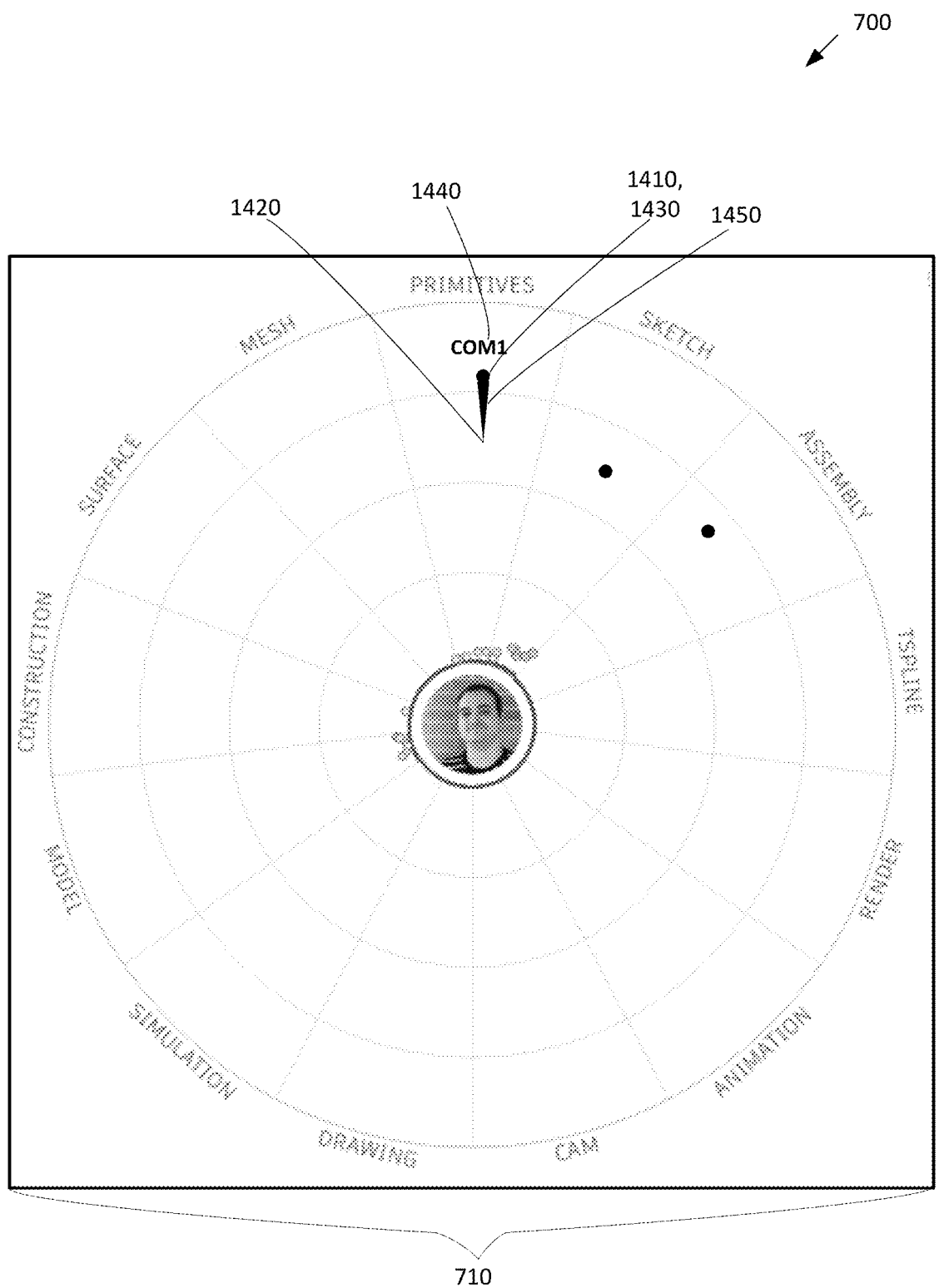
FIG. 14A is a screenshot of the command map GUI implemented in FIG. 1 for displaying an updated data point at a first highlighting stage, according to various embodiments.

FIG. 14A is a screenshot of the command map GUI implemented in FIG. 1 for displaying an updated data point at a first highlighting stage, according to various embodiments. As shown, the command map GUI 700 displays a first data point 1410 corresponding to a first command ("COM1") and a first entity. New command usage data included in a first updated command usage data is associated with the first command and the first data point 1410 (i.e., the new command usage data specifies the first command). In response to receiving first updated command usage data for the first command and the first entity, the command map GUI 700 updates the distance/position of the first data point on the circle chart 710 from a first distance/position 1420 to a second distance/position 1430. The first distance/position 1420 of the first data point 1410 comprises the distance/position of the first data point 1410 on the circle chart 710 prior to the first updated command usage data being received by the command map GUI 700. For example, the first distance/position 1420 can represent how much the first user entity has used the first command as indicated in the initial command usage data. The second distance/position 1430 of the first data point 1410 comprises the updated distance/position of the first data point 1410 on the circle chart 710 after the first updated command usage data is received by the command map GUI 700. Therefore, the second distance/position 1430 represents how much the first user entity has used the first command as indicated in the first updated command usage data.

Figure 14B:
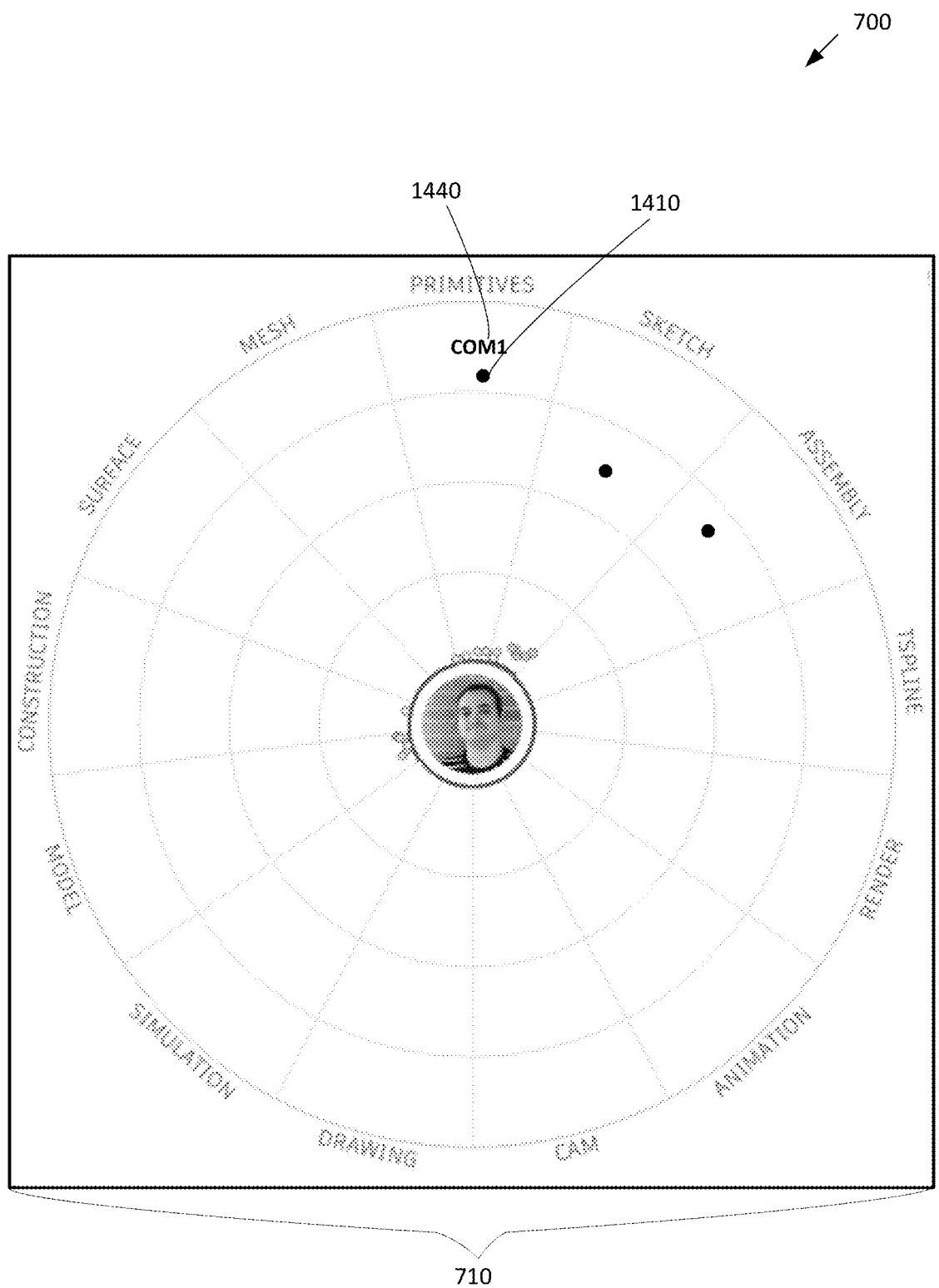
FIG. 14B is a screenshot of the command map GUI implemented in FIG. 1 for displaying an updated data point at a second highlighting stage, according to various embodiments.
Figure 14C:
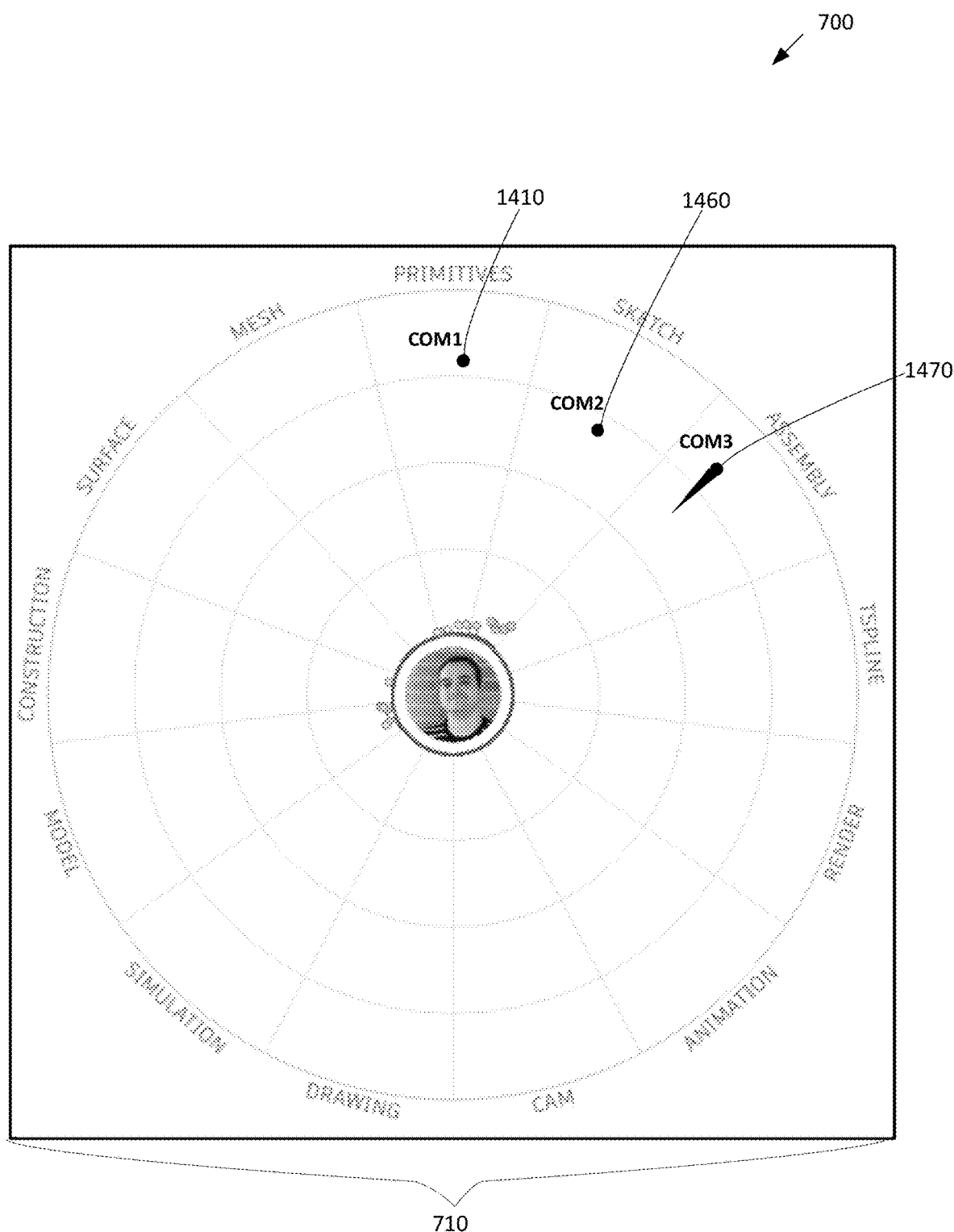
FIG. 14C is a screenshot of the command map GUI implemented in FIG. 1 for displaying an updated data point at a third highlighting stage, according to various embodiments.

In response to receiving the first updated command usage data for the first command and the first entity, the command map GUI 700 can display a series of one or more different highlighting stages/levels for the corresponding first data point 1410. For example, when the first updated command usage data is initially received, the command map GUI 700 displays, in series, a first highlighting stage/level for the first data point 1410 (as shown in FIG. 14A), then a second highlighting stage/level for the first data point 1410 (as shown in FIG. 14B), then a third highlighting stage/level for the first data point 1410 (as shown in FIG. 14C), and so forth. Each highlighting stage in the series of highlighting stages causes the first data point 1410 to be displayed with a different appearance (highlighted appearance) than all other data points ("non-updated" data points) displayed in the circle chart 710. In addition, each highlighting stage in the series of highlighting stages causes the first data point 1410 to be displayed with a different appearance than in other highlighting stages in the series of highlighting stages. The "different appearance" implemented at each highlighting stage includes at least one different display characteristic, such as color, color intensity, brightness, texture, shading, pattern, line form, and the like.

In some embodiments, the first highlighting stage enables the first data point 1410 to be the most highlighted (most visually distinct) relative to other data points displayed on the circle chart 710, the second highlighting stage enables the first data point 1410 to be the second-most highlighted (second-most visually distinct) relative to other data points displayed on the circle chart 710, the third highlighting stage enables the first data point 1410 to be the third-most highlighted (third-most visually distinct) relative to other data points displayed on the circle chart 710, and so forth. In this manner, the intensity of the highlighting of the first data point 1410 continually decreases after the first updated command usage data is initially received, until the first data point 1410 is eventually displayed with the same appearance as other non-updated data points in the circle chart 710.

The trigger for transitioning from one highlighting stage to a next highlighting stage in the series of highlighting stages can be based on elapsed time or based on a next updated command usage data being received by the command map GUI 700. For example, the first data point 1410 can transition from the first highlighting stage to the second highlighting stage after a first predetermined time period (such as 1 second), then transition from the second highlighting stage to the third highlighting stage after a second predetermined time period (such as 2 seconds), and so forth.

As another example, the first data point 1410 can transition from the first highlighting stage to the second highlighting stage after a next updated command usage data is received, then transition from the second highlighting stage to the third highlighting stage after another next updated command usage data is received, and so forth.

In some embodiments, the first highlighting stage for the first data point 1410 is displayed immediately after the first updated command usage data is received. As shown in FIG. 14A, the first highlighting stage can include displaying an animation 1450 and command text 1440 ("COM1"). The animation 1450 (such as a comet animation) is displayed adjacent to the first data point 1410 to illustrate the movement of the first data point 1410 from the first distance/position 1420 to the second distance/position 1430 on the circle chart 710. The command text 1440 is displayed adjacent to the first data point 1410 and indicates the identifier of the first command that corresponds to the first data point 1410. At the first highlighting stage, the first data point 1410 is also highlighted to be the most visually distinct from the other data points of the circle chart 710 relative to the other highlighting stages. For example, the first data point 1410 can have an entirely different color (such as red) than the color of the other data points (such as light blue) of the circle chart 710.

Immediately after the first highlighting stage, the first data point 1410 transitions to a second highlighting stage (for example, after 1 second or after a next updated command usage data is received). FIG. 14B is a screenshot of the command map GUI implemented in FIG. 1 for displaying an updated data point at a second highlighting stage, according to various embodiments. As shown, in the second highlighting stage for the first data point 1410, the command text 1440 is still displayed adjacent to the first data point 1410, but the animation 1450 is no longer displayed. At the second highlighting stage, the first data point 1410 is also highlighted to be the second-most visually distinct from the other non-updated data points of the circle chart 710 relative to the other highlighting stages. For example, the first data point 1410 can have the same color as the other non-updated data points of the circle chart 710, but have a different intensity. For example, the first data point 1410 can be displayed as dark blue and the other data points can be displayed as light blue.

Immediately after the second highlighting stage, the first data point 1410 transitions to a third highlighting stage (for example, after 2 seconds or after a next updated command usage data is received). FIG. 14C is a screenshot of the command map GUI implemented in FIG. 1 for displaying an updated data point at a third highlighting stage, according to various embodiments. As shown, in the third highlighting stage for the first data point 1410, the command text 1440 is still displayed adjacent to the first data point 1410. At the second highlighting stage, the first data point 1410 is highlighted to be the third-most visually distinct from the other non-updated data points of the circle chart 710 relative to the other highlighting stages. For example, the first data point 1410 can have the same color as the other non-updated data points of the circle chart 710, but have a different intensity. For example, the first data point 1410 can be displayed as medium blue and the other data points can be displayed as light blue.

FIG. 14C shows a first data point 1410 corresponding to a first command ("COM1") and the first entity, a second data point 1460 corresponding to a second command ("COM2") and the first entity, and a third data point 1470 corresponding to a third command ("COM3") and the first entity. In the example of FIG. 14C, the first command is invoked first, then the second command is invoked after the first command, and then the third command is invoked after the second command. As the third command is the most recently invoked command, the third data point 1470 corresponding to the third command is displayed at the first highlighting stage, which includes an animation and command text ("COM3"). The second data point 1460 corresponding to the second command is displayed at the second highlighting stage, which includes a command text ("COM2") and does not include an animation. The first data point 1410 corresponding to the first command is displayed at the third highlighting stage, which includes a command text ("COM3") and does not include an animation.

Note that the different highlighting stages include different levels of highlighting the data point and command text, each subsequent highlighting stage decreasing the intensity of the highlighting relative to the prior highlighting stage. For example, at the first highlighting stage, the data point and corresponding command text can be displayed in red color. At the second highlighting stage, the data point and corresponding command text can be displayed in dark blue color. At the third highlighting stage, the data point and corresponding command text can be displayed in medium blue color. In this example, the other non-updated data points are displayed in light blue color, so that data points at each highlighting stage are all displayed with a different highlighted appearance relative to the non-updated data points. In this manner, the intensity of the highlighting of an updated data point continually decreases as time passes or the next updated command usage data is received, until the updated data point is eventually displayed with the same appearance as other non-updated data points in the circle chart 710. In the example of FIG. 14C, each updated data point 1410, 1460, and 1470 would eventually by displayed with no command text and have the same light blue color as other non-updated data points in the circle chart 710.

Figure 15:
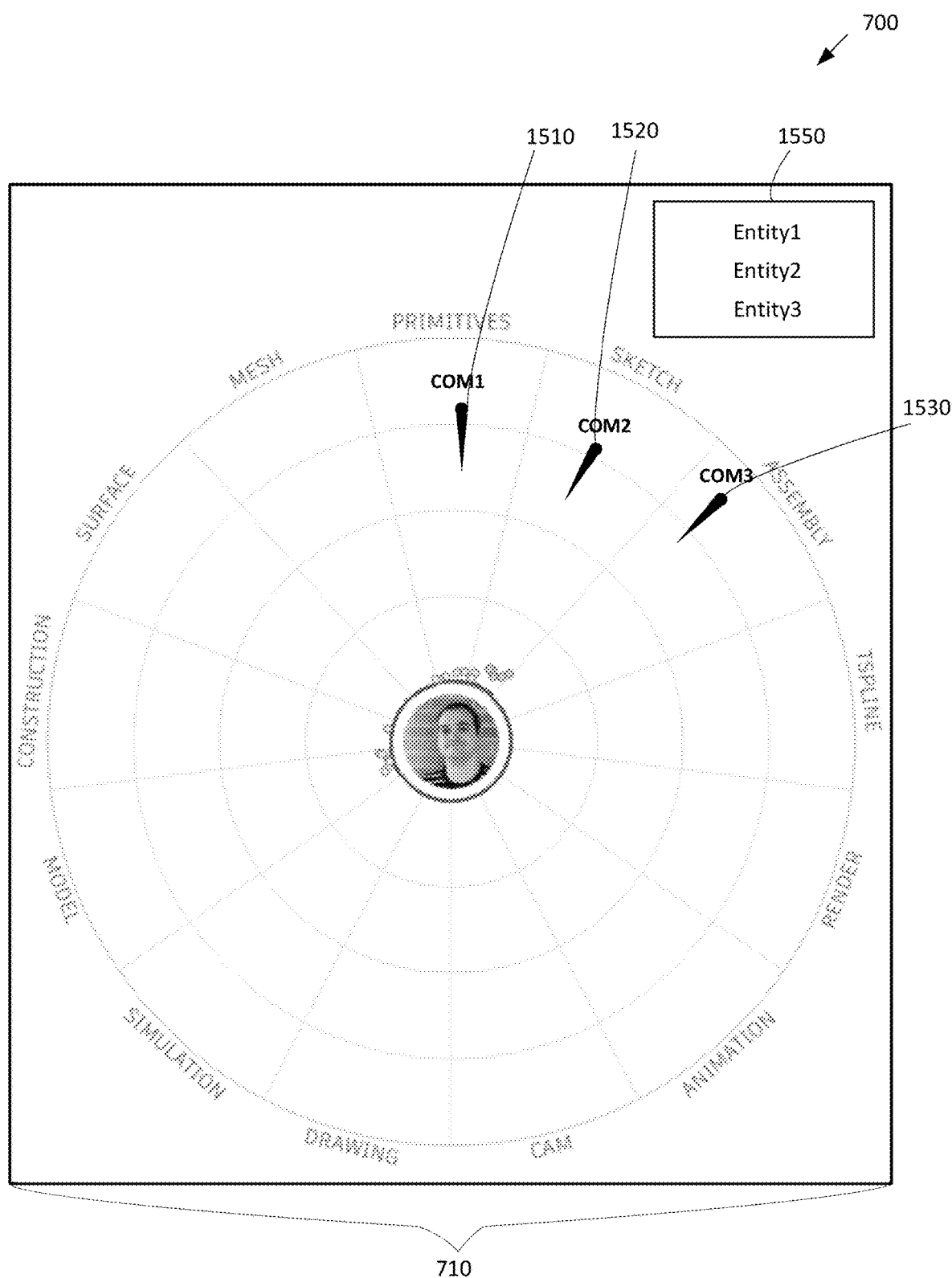
FIG. 15 is a screenshot of the command map GUI implemented in FIG. 1 for displaying updated data points for a plurality of entities, according to various embodiments.

In some embodiments, the command map GUI engine 132 configures the command map GUI 700 to automatically and dynamically update the distance/position of data points of the circle chart 710 that correspond to commands of two or more different entities. FIG. 15 is a screenshot of the command map GUI implemented in FIG. 1 for displaying updated data points for a plurality of entities, according to various embodiments. The command map GUI 700 displays a first data point 1510 corresponding to a first command ("COM1") and a first entity ("Entity1"), a second data point 1520 corresponding to a second command ("COM2") and a second entity ("Entity2"), and a third data point 1530 corresponding to a third command ("COM3") and a third entity ("Entity3"). The data points for each entity can be displayed with a different assigned appearance. The command map GUI 700 can include a legend 1550 that indicates a particular appearance assigned for the data points of each entity. For example, the data points for the first entity can be assigned a red color, the data points for the second entity can be assigned a green color, and the data points for the third entity can be assigned a blue color. The data points for each entity can also be updated and displayed via a series of different highlighting stages, as discussed above in relation to FIGS. 14A-C.

Server and Client Machines

Figure 16:
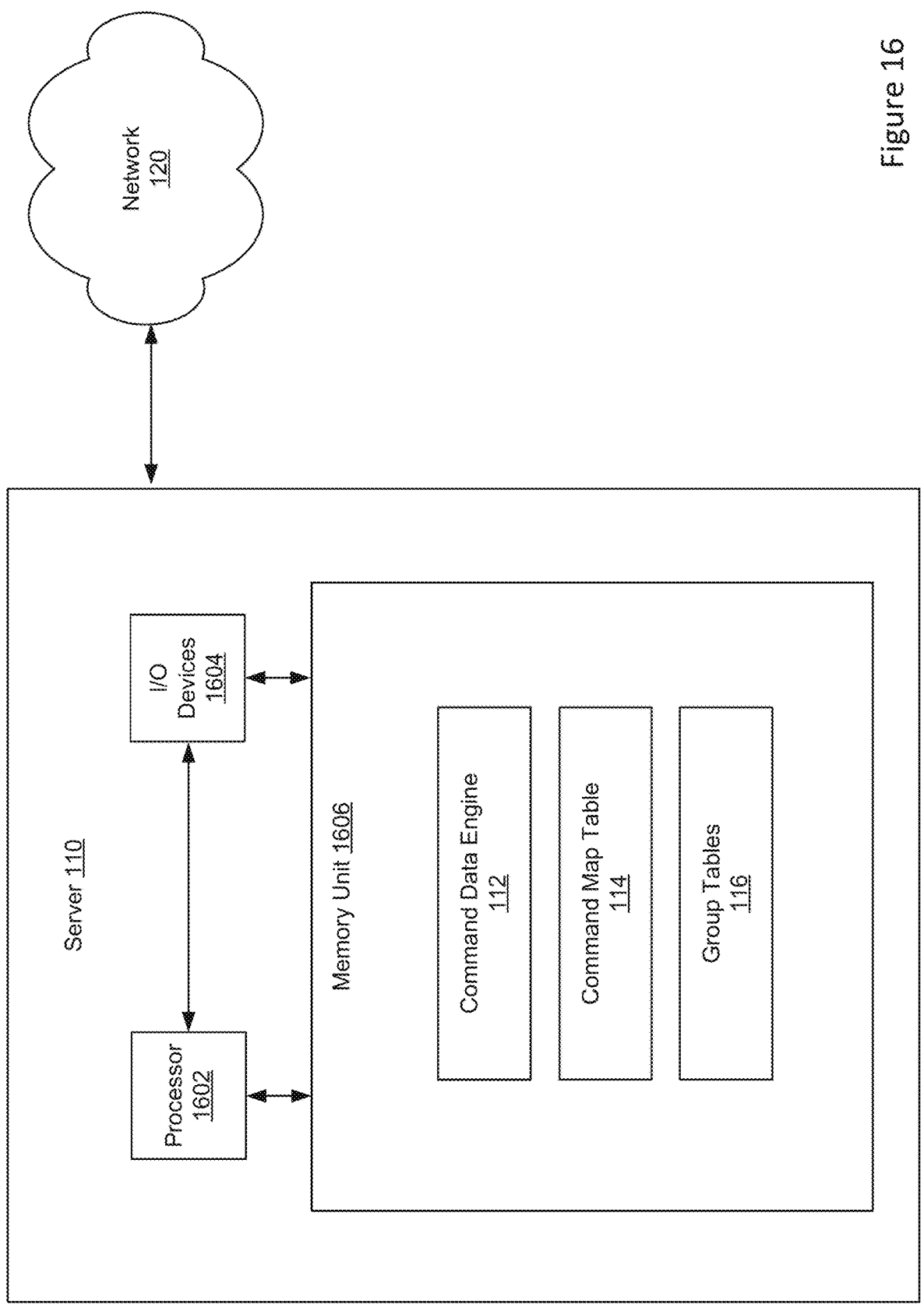
FIG. 16 illustrates an exemplary server device that can be implemented in the command map system of FIG. 1, according to various embodiments.

FIG. 16 illustrates an exemplary server device that can be implemented in the command map system of FIG. 1, according to various embodiments. The server 110 can comprise a computing device or machine, such as a server system, desktop computer, laptop computer, or any other type of computing device suitable for practicing various embodiments. The server 110 comprises at least one processor 1602, input/output (I/O) devices 1604, and a memory unit 1606, coupled together. The server 110 is coupled to a network 120 via a network interface (not shown). The network 120 can comprise any technically feasible communications or information network, wired or wireless, that allows data exchange, such as a wireless (Wi-Fi) network, personal area network (such as Bluetooth, Wireless USB, IrDA, etc.), wide area network (WAN), a local area network (LAN), and/or the Internet, among others.

In general, a processor 1602 can be any technically feasible processing device or hardware unit capable of processing data and executing software applications and program code. The processor 1602 executes the software and performs the functions and operations set forth in the embodiments described herein. For example, a processor 1602 can comprise a central processing unit (CPU), a graphics processing unit (GPU), a digital signal processor (DSP), an application-specific integrated circuit (ASIC), a field programmable gate array (FPGA) or other programmable logic device, discrete gate or transistor logic, discrete hardware components, or any combination of different processing units, such as a CPU configured to operate in conjunction with a GPU.

The memory unit 1606 can include a hard disk, a random access memory (RAM) module, a flash memory unit, or any other type of memory unit or combination thereof. Processor and I/O devices read data from and write data to memory 1606. The memory unit 1606 is configured to store software application(s) and data. Instructions from the software constructs within the memory unit 1606 are executed by processors to enable the operations and functions described herein. In various embodiments, the memory unit 1606 is configured to store a command data engine 112, command map table 114, and at least one group table 116 for performing embodiments herein. The server 110 can be connected to a database 125 (not shown) that stores command usage data 127 received from the clients 130. The processor 1602 is configured to execute the command data engine 1602 to provide an underlying functionality of a command map system as described in various embodiments herein.

I/O devices 1604 are also coupled to memory 1606 and can include devices capable of receiving input, such as a keyboard, a mouse, a trackball, and so forth, as well as devices capable of providing output, such as a display, speaker, and so forth. Additionally, I/O devices can include devices capable of both receiving input and providing output, such as a touchscreen, a universal serial bus (USB) port, and so forth.

Figure 17:
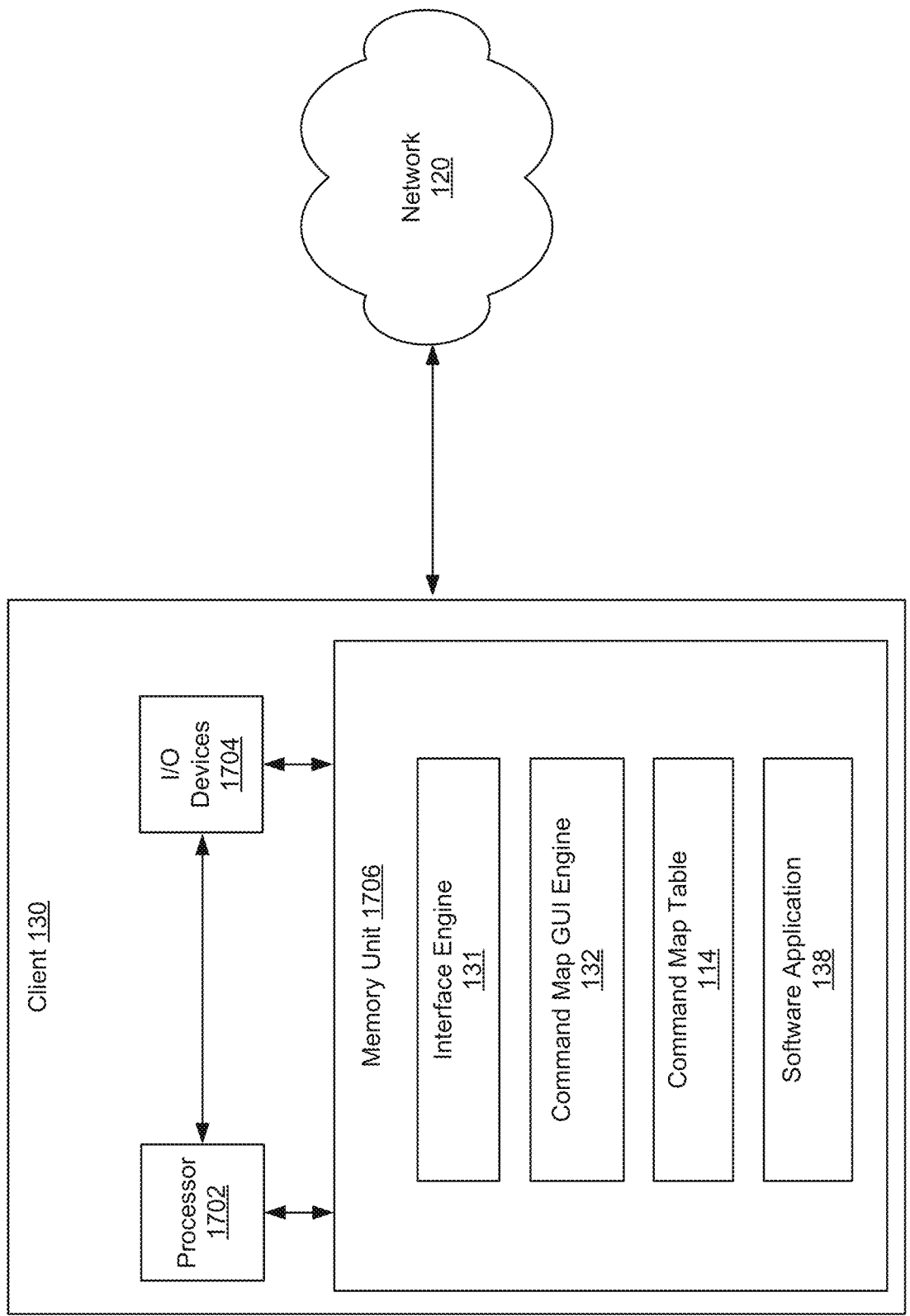
FIG. 17 illustrates an exemplary client device that can be implemented in the command map system of FIG. 1, according to various embodiments.

FIG. 17 illustrates an exemplary client device that can be implemented in the command map system of FIG. 1, according to various embodiments. The client 130 can comprise a computing device or machine, such as a desktop computer, laptop computer, mobile device, or any other type of computing device suitable for practicing various embodiments.

The client 130 comprises at least one processor 1702, input/output (I/O) devices 1704, and a memory unit 1706, coupled together. The client 130 is coupled to a network 120 via a network interface (not shown). In general, a processor 1702 can be any technically feasible processing device or hardware unit capable of processing data and executing software applications and program code. The processor 1702 executes the software and performs the functions and operations set forth in the embodiments described herein.

For example, a processor 1702 can comprise a central processing unit (CPU), a graphics processing unit (GPU), a digital signal processor (DSP), an application-specific integrated circuit (ASIC), a field programmable gate array (FPGA) or other programmable logic device, discrete gate or transistor logic, discrete hardware components, or any combination of different processing units, such as a CPU configured to operate in conjunction with a GPU.

The memory unit 1706 can include a hard disk, a random access memory (RAM) module, a flash memory unit, or any other type of memory unit or combination thereof. Processor and I/O devices read data from and write data to memory 1706. The memory unit 1706 is configured to store software application(s) and data. Instructions from the software constructs within the memory unit 1706 are executed by processors to enable the operations and functions described herein. In various embodiments, the memory unit 1706 is configured to store an interface engine 131, a command map GUI engine 132, a software application 138, and a command map table 114 for performing embodiments herein. The processor 1702 is configured to execute the interface engine 131 and the command map GUI engine 132 to provide an underlying functionality of a command map system as described in various embodiments herein.

I/O devices 1704 are also coupled to memory 1706 and can include devices capable of receiving input, such as a keyboard, a mouse, a trackball, and so forth, as well as devices capable of providing output, such as a monitor/display, speaker, and so forth. Additionally, I/O devices can include devices capable of both receiving input and providing output, such as a touchscreen, a universal serial bus (USB) port, and so forth. In particular, the I/O devices can further include a display monitor that displays the command map GUI or any other type of GUI.

In sum, embodiments described herein include techniques for displaying usage patterns of commands of a software application for one or more user entities in real-time or near real-time. A current user/client receives, from a server, command usage data for the one or more user entities for a particular time period and displays graphical representations of the command usage data via a command map GUI. A server then receives new command usage data from an invoking user/client included in the one or more entities. The new command usage data describes a new instance of an executed command by the invoking user/client. In response to receiving the new command usage data, the server updates command usage data for the invoking user/client and the one or more entities, and causes graphical representations of the updated command usage data to be displayed in the command map GUI of the current user/client in real-time or near real-time.

In these embodiments, the receiving of new command usage data at the server automatically initiates/triggers the server to perform the steps of: updating the command usage data in a database for the invoking user and/or one or more entities based on the new command usage data, retrieving the updated command usage data for the one or more entities from the database, pushing/sending the updated command usage data to the current user/client, and causing graphical representations of the updated command usage data to be displayed at the current user/client in real-time or near real-time. In this manner, the command usage data of the one or more user entities is instantly updated and displayed in the GUI as any user included in the one or more user entities invokes new commands of the software application in real-time or near real-time. Thus, the current user/client does not need to request ("pull") updated command usage data from the server when new commands of the software application are invoked, and the user does not need to request displaying of the updated command usage data on the command map GUI. Rather, the server continuously "pushes" the updated command usage data to the current user/client for display in real-time or near real-time whenever new command usage data is received by the server. Therefore, the trigger mechanism for the server to push/send updated command usage data to the client is the receiving of new command usage data for a new command. Consequently, the trigger mechanism for the server to send updated command usage data to the client is not the receiving of a request/query from the client to send updated command usage data (pulling updated command usage data).

The updated command usage data can be displayed in the command map GUI in various ways in real-time or near real-time, including updated data points that reflect usage of specific commands and updated wedges that reflect usage of command categories of the software application. Various animations can also be used in displaying the updated data points and/or updated wedges, such as flashing graphics, animations, and command text that highlight newly invoked commands. The command map GUI can include a circle chart for dynamically displaying graphical representations of updated command usage data as updated command usage data is continually received. In other embodiments, the command map GUI can include a non-circular chart (such as a rectangular chart, column chart, bar chart, and the like) for dynamically displaying graphical representations of updated command usage data as updated command usage data is continually received.

At least one technical advantage of the disclosed techniques relative to the prior art is that updated command usage data is automatically pushed to a computer device in real-time or near real-time or near real-time to enable the computer device to dynamically generate and display graphical representations of the updated command usage data via a command map graphical user interface (GUI). The graphical representations of the updated command usage data also are displayed in real-time or near real-time to visually indicate how much a particular entity (user or group of users) uses the different commands of a software application. Another technical advantage is that the disclosed techniques allow a user to more immediately evaluate his/her command usage patterns, as well as compare his/her command usage patterns to other entities, in real-time or near real-time as the user and/or other entities continually invoke the commands of a software application. In that regard, because command usage data is updated and displayed via the command map GUI in real-time or near real-time, the user is more engaged and more conscious of his/her command usage patterns. Further, because the command map GUI enables the interactions of a user or group of users with a computer device through command usage patterns to be efficiently and effectively visualized and displayed, the disclosed techniques in real-time can improve the overall functioning and operations of the computer device relative to the prior art. These technical advantages represent one or more technological advancements over prior art approaches.

Aspects of the subject matter described herein are set out in the following numbered clauses.

1. In some embodiments, a computer-implemented method, comprising: receiving, at a client device, initial command usage data for a first user entity indicating how much the first user entity has used a set of commands of a software application; displaying one or more graphical representations of the initial command usage data via a command map graphical user interface (GUI); receiving, at the client device, updated command usage data for the first user entity that has been pushed to the client device and has been generated based on new command usage data not included in the initial command usage data; and in response to receiving the updated command usage data, automatically displaying one or more graphical representations of the updated command usage data via the command map GUI.

2. The computer-implemented method of clause 1, wherein the new command usage data is generated for a new invocation of a first command included in the set of commands by a user included in the first user entity.

3. The computer-implemented method of any of clauses 1-2, wherein: the updated command usage data is automatically generated based on the new command usage data in real-time or near real-time; and the one or more graphical representations of the updated command usage data are automatically displayed via the command map GUI in real-time or near real-time.

4. The computer-implemented method of any of clauses 1-3, wherein a server machine automatically pushes the updated command usage data to the client device in response to receiving the new command usage data.

5. The computer-implemented method of any of clauses 1-4, further comprising: receiving, via the command map GUI, a selection of a time period, wherein the end time of the time period is subsequent to a current time; and repeatedly receiving, at the client device, additional updated command usage data for the first user entity until the end time of the time period.

6. The computer-implemented method of any of clauses 1-5, wherein the first user entity comprises an individual user or a plurality of users.

7. The computer-implemented method of any of clauses 1-6, wherein the initial command usage data further indicates how much a second user entity has used the set of commands of the software application, the method further comprising: receiving, at the client, next updated command usage data for the first user entity and the second user entity that has been pushed to the client device and has been generated based on next new command usage data not included in the updated command usage data; and in response to receiving the next updated command usage data, automatically displaying one or more graphical representations of the next updated command usage data via the command map GUI.

8. The computer-implemented method of any of clauses 1-7, wherein automatically displaying one or more graphical representations of the updated command usage data via the command map GUI comprises: displaying a different data point for each command included in the set of commands, wherein a first data point represents a first command included in the set of commands, and the new command usage data is associated with the first data point and the first command; and in response to receiving the updated command usage data, displaying the first data point with a highlighted appearance.

9. The computer-implemented method of any of clauses 1-8, wherein displaying the first data point with the highlighted appearance comprises at least one of displaying an animation adjacent to the first data point or displaying command text adjacent to the first data point that specifies the first command.

10. The computer-implemented method of any of clauses 1-9, wherein displaying the first data point with the highlighted appearance comprises displaying the first data point in a plurality of stages, wherein each stage displays the first data point with a different highlighted appearance relative to one or more other stages in the plurality of stages.

11. In some embodiments, one or more non-transitory computer-readable media including instructions that, when executed by one or more processors, cause the one or more processors to perform the steps of: receiving, at a client device, initial command usage data for a first user entity indicating how much the first user entity has used a set of commands of a software application; displaying one or more graphical representations of the initial command usage data via a command map graphical user interface (GUI); receiving, at the client device, updated command usage data for the first user entity that has been pushed to the client device and has been generated based on new command usage data not included in the initial command usage data; and in response to receiving the updated command usage data, automatically displaying one or more graphical representations of the updated command usage data via the command map GUI.

12. The one or more non-transitory computer-readable media of clause 11, wherein the new command usage data is generated for a new invocation of a first command included in the set of commands by a user included in the first user entity.

13. The one or more non-transitory computer-readable media of any of clauses 11-12, wherein automatically displaying one or more graphical representations of the updated command usage data via the command map GUI comprises: displaying a different data point for each command included in the set of commands, wherein a first data point represents a first command included in the set of commands, and the new command usage data is associated with the first data point and the first command; and in response to receiving the updated command usage data, displaying the first data point with a highlighted appearance.

14. The one or more non-transitory computer-readable media of any of clauses 11-13, wherein displaying the first data point with the highlighted appearance comprises displaying the first data point in a plurality of stages, wherein each stage displays the first data point with a different highlighted appearance relative to one or more other stages in the plurality of stages.

15. The one or more non-transitory computer-readable media of any of clauses 11-14, wherein a transition between each stage in the plurality of stages is triggered by at least one of elapsed time or receiving next updated command usage data for the first user entity.

16. The one or more non-transitory computer-readable media of any of clauses 11-15, wherein a first stage in the plurality of stages includes displaying an animation adjacent to the first data point and a command text specifying the first command adjacent to the first data point.

17. The one or more non-transitory computer-readable media of any of clauses 11-16, wherein a second stage in the plurality of stages includes displaying the command text adjacent to the first data point and not displaying the animation adjacent to the first data point.

18. A system comprising: a server machine comprising: a server memory that includes instructions; and a server processor that is coupled to the server memory and, upon executing the instructions, performs the steps of: sending, to a client device, initial command usage data for a first user entity indicating how much the first user entity has used a set of commands of a software application; receiving new command usage data not included in the initial command usage data; and in response to receiving the new command usage data, pushing updated command usage data for the first user entity to the client device; and the client device connected to the server machine, the client device comprising: a client memory that includes instructions; and a client processor that is coupled to the client memory and, upon executing the instructions, performs the steps of: displaying one or more graphical representations of the initial command usage data via a command map graphical user interface (GUI); receiving the updated command usage data for the first user entity; and in response to receiving the updated command usage data, automatically displaying one or more graphical representations of the updated command usage data via the command map GUI.

19. The system of clause 18, wherein the new command usage data is generated for a new invocation of a first command included in the set of commands by a user included in the first user entity.

20. The system of any of clauses 18-19, wherein the server machine automatically generates the updated command usage data based on the new command usage data in real-time or near real-time in response to receiving the new command usage data.

Any and all combinations of any of the claim elements recited in any of the claims and/or any elements described in this application, in any fashion, fall within the contemplated scope of the present embodiments and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments can be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure can be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams can represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure can be devised without departing from the basic scope thereof, and the scope thereof is determined by the claims that follow.

What is claimed is:

1. A computer-implemented method, comprising:
receiving, at a client device and from a server machine, initial command usage data for a first user entity that is executing commands on the client device and a second user entity that is executing commands on a second client device, the initial command usage data indicating how much the first user entity and the second user entity have used a set of commands of a software application, wherein the initial command usage data includes a number of times the first user entity has invoked a first command and a number of times the second user entity has invoked the first command;
displaying, via a command map graphical user interface (GUI), the command map GUI comprising a circle chart comprising one or more graphical representations of the number of times the first user entity has invoked the first command and one or more graphical representations of the number of times the second user entity has invoked the first command;

receiving, at the client device and from the server machine, updated command usage data for the first user entity and the second user entity that has been generated by the server machine based on a first new command that is executed by the second user entity on the second client device and has been pushed by the server machine over a first communication network to the client device in real-time or near real-time upon execution of the first new command; and in response to receiving the updated command usage data:

generating a first value indicating a level of proficiency of the second user entity based on a command usage pattern associated with the updated command usage data;

generating a second value indicating a level of proficiency of the first user entity based on a command usage pattern of the first user associated with the updated command usage data, the second value indicating a greater level of proficiency than the first value;

automatically generating and displaying, by the client device using the generated first value and the second value, one or more graphical representations of the updated command usage data via the command map GUI in real-time or near real-time, wherein the one or more graphical representations of the updated command usage data visually illustrate the first value indicating the level of proficiency of the second user entity, wherein the second value is displayed as a second point that is a greater distance from a center of the circle chart than a first point corresponding to the first value.

2. The computer-implemented method of claim 1, wherein new command usage data is generated for a new invocation of a second command included in the set of commands by a user included in the first user entity.

3. The computer-implemented method of claim 1, further comprising:

receiving, via the command map GUI, a selection of a time period, wherein an end time of the time period is subsequent to a current time; and repeatedly receiving, at the client device, additional updated command usage data for the first user entity and the second user entity until the end time of the time period.

4. The computer-implemented method of claim 1, wherein the first user entity comprises an individual user or a plurality of users.

5. The computer-implemented method of claim 1, wherein the initial command usage data further indicates how much the second user entity has used the set of commands of the software application, the method further comprising:

receiving, at the client device, next updated command usage data for the first user entity and the second user entity that has been pushed to the client device and has been generated based on next command usage data not included in the updated command usage data; and in response to receiving the next updated command usage data, automatically displaying one or more graphical representations of the next updated command usage data via the command map GUI.

6. The computer-implemented method of claim 1, wherein automatically displaying one or more graphical representations of the updated command usage data via the command map GUI comprises:

displaying a different data point for each command included in the set of commands, wherein a first data point represents the first command, and new command usage data is associated with the first data point and the first command; and in response to receiving the updated command usage data, displaying the first data point with a highlighted appearance.

7. The computer-implemented method of claim 6, wherein displaying the first data point with the highlighted appearance comprises at least one of displaying an animation adjacent to the first data point or displaying command text adjacent to the first data point that specifies the first command.

8. The computer-implemented method of claim 6, wherein displaying the first data point with the highlighted appearance comprises displaying the first data point in a plurality of stages, wherein each stage displays the first data point with a different highlighted appearance relative to one or more other stages in the plurality of stages.

9. One or more non-transitory computer-readable media including instructions that, when executed by one or more processors, cause the one or more processors to perform the steps of:

receiving, at a client device and from a server machine, initial command usage data for a first user entity that is executing commands on the client device and a second user entity that is executing commands on a second client device, the initial command usage data indicating how much the first user entity and the second user entity have used a set of commands of a software application, wherein the initial command usage data includes a number of times the first user entity has invoked a first command and a number of times the second user entity has invoked the first command;

displaying, via a command map graphical user interface (GUI), the command map GUI comprising a circle chart comprising one or more graphical representations of the number of times the first user entity has invoked the first command and one or more graphical representations of the number of times the second user entity has invoked the first command;

receiving, at the client device and from the server machine, updated command usage data for the first user entity and the second user entity that has been generated by the server machine based on a first new command that is executed by the second user entity on the second client device and has been pushed by the server machine over a first communication network to the client device in real-time or near real-time upon execution of the first new command; and in response to receiving the updated command usage data:

generating a first value indicating a level of proficiency of the second user entity based on a command usage pattern associated with the updated command usage data;

generating a second value indicating a level of proficiency of the first user entity based on a command usage pattern of the first user associated with the updated command usage data, the second value indicating a greater level of proficiency than the first value;

automatically generating and displaying, by the client device using the generated first value and the second value, one or more graphical representations of the updated command usage data via the command map GUI in real-time or near real-time, wherein the one or more graphical representations of the updated command usage data visually illustrate the first value indicating the level of proficiency of the second user entity, wherein the second value is displayed as a second point that is a greater distance from a center of the circle chart than a first point corresponding to the first value.

10. The one or more non-transitory computer-readable media of claim 9, wherein new command usage data is generated for a new invocation of the first command included in the set of commands by a user included in the first user entity.

11. The one or more non-transitory computer-readable media of claim 9, wherein automatically displaying one or more graphical representations of the updated command usage data via the command map GUI comprises:
displaying a different data point for each command included in the set of commands, wherein a first data point represents a second command included in the set of commands, and new command usage data is associated with the first data point and the second command; and
in response to receiving the updated command usage data, displaying the first data point with a highlighted appearance.

12. The one or more non-transitory computer-readable media of claim 11, wherein displaying the first data point with the highlighted appearance comprises displaying the first data point in a plurality of stages, wherein each stage displays the first data point with a different highlighted appearance relative to one or more other stages in the plurality of stages.

13. The one or more non-transitory computer-readable media of claim 12, wherein a transition between each stage in the plurality of stages is triggered by at least one of elapsed time or receiving next updated command usage data for the first user entity.

14. The one or more non-transitory computer-readable media of claim 12, wherein a first stage in the plurality of stages includes displaying an animation adjacent to the first data point and a command text specifying the first command adjacent to the first data point.

15. The one or more non-transitory computer-readable media of claim 14, wherein a second stage in the plurality of stages includes displaying the command text adjacent to the first data point and not displaying the animation adjacent to the first data point.

16. A system comprising:
a server machine comprising:
a server memory that includes instructions; and
a server processor that is coupled to the server memory and, upon executing the instructions, performs the steps of:
sending, to a client device, initial command usage data for a first user entity that is executing commands on the client device and a second user entity that is executing commands on a second client device, the initial command usage data indicating how much the first user entity and the second user entity have used a set of commands of a software application, wherein the initial command usage data includes a number of times the first user entity has invoked a first command and a number of times the second user entity has invoked the first command;
receiving new command usage data based on a first new command that is executed by the second user entity on the second client device; and
in response to receiving the new command usage data, pushing updated command usage data for the first user entity and the second user entity that has been generated based on the first new command over a first communication network to the client device in real-time or near real-time upon execution of the first new command; and
the client device connected to the server machine, the client device comprising:
a client memory that includes instructions; and
a client processor that is coupled to the client memory and, upon executing the instructions, performs the steps of:
displaying, via a command map graphical user interface (GUI), the command map GUI comprising a circle chart comprising one or more graphical representations of the number of times the first user entity has invoked the first command and one or more graphical representations of the number of times the second user entity has invoked the first command;
receiving the updated command usage data for the first user entity and the second user entity; and
in response to receiving the updated command usage data:
generating a first value indicating a level of proficiency of the second user entity based on a command usage pattern associated with the updated command usage data;
generating a second value indicating a level of proficiency of the first user entity based on a command usage pattern of the first user associated with the updated command usage data, the second value indicating a greater level of proficiency than the first value;
automatically generating and displaying, using the generated first value and the second value, one or more graphical representations of the updated command usage data via the command map GUI in real-time or near real-time, wherein the one or more graphical representations of the updated command usage data visually illustrate the first value indicating the level of proficiency of the second user entity, wherein the second value is displayed as a second point that is a greater distance from a center of the circle chart than a first point corresponding to the first value.

17. The system of claim 16, wherein second command usage data is generated for a new invocation of the first command included in the set of commands by a user included in the first user entity.

18. The system of claim 16, wherein the server machine automatically generates the updated command usage data based on the new command usage data in real-time or near real-time in response to receiving the new command usage data.

* * * * *